(12) United States Patent
Chang et al.

(10) Patent No.: US 10,911,833 B2
(45) Date of Patent: Feb. 2, 2021

(54) METHOD AND DEVICE FOR PROVIDING INFORMATION ON CONTENT

(71) Applicant: Samsung Electronics Co., Ltd., Suwon-si (KR)

(72) Inventors: Tae-kwon Chang, Seoul (KR); Min-soo Kim, Yongin-si (KR); Hyon-sok Lee, Seoul (KR); Ji-woong Choi, Seoul (KR); Jong-youb Ryu, Hwaseong-si (KR); Hae-in Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/475,554

(22) PCT Filed: Jan. 2, 2018

(86) PCT No.: PCT/KR2018/000029
§ 371 (c)(1),
(2) Date: Jul. 2, 2019

(87) PCT Pub. No.: WO2018/124842
PCT Pub. Date: Jul. 5, 2018

(65) Prior Publication Data
US 2019/0349640 A1    Nov. 14, 2019

(30) Foreign Application Priority Data

Jan. 2, 2017    (KR) .................. 10-2017-0000341

(51) Int. Cl.
*H04N 21/482* (2011.01)
*H04N 21/414* (2011.01)
(Continued)

(52) U.S. Cl.
CPC ... *H04N 21/4828* (2013.01); *H04N 21/41407* (2013.01); *H04N 21/4722* (2013.01); *H04N 21/6582* (2013.01)

(58) Field of Classification Search
CPC ......... H04N 21/4828; H04N 21/41407; H04N 21/4722; H04N 21/6582; H04N 21/8133;
(Continued)

(56) References Cited

U.S. PATENT DOCUMENTS

2009/0055383 A1\* 2/2009 Zalewski ........... H04N 21/4755
2015/0113557 A1 4/2015 Kim et al.
(Continued)

FOREIGN PATENT DOCUMENTS

KR    10-2010-0128895 A    12/2010
KR    10-2011-0115088 A    10/2011
(Continued)

OTHER PUBLICATIONS

International Search Report dated Apr. 20, 2018, issued in International Application No. PCT/KR2018/000029.

*Primary Examiner* — Benjamin R Bruckart
*Assistant Examiner* — Tien M Nguyen
(74) *Attorney, Agent, or Firm* — Jefferson IP Law, LLP

(57) ABSTRACT

Provided is a method of providing information about content, performed by a mobile device, the method including detecting an electronic device displaying the content, determining whether at least one search application is executed on the mobile device, as the electronic device is detected, transmitting a request for recognition information indicating at least one object related to the content to the electronic device, as the at least one search application is executed, and receiving the requested recognition information from the electronic device.

13 Claims, 25 Drawing Sheets

(51) Int. Cl.
*H04N 21/4722* (2011.01)
*H04N 21/658* (2011.01)

(58) Field of Classification Search
CPC .......... H04N 21/4131; H04N 21/44231; H04L 12/2823; H04W 8/005
See application file for complete search history.

(56) References Cited

U.S. PATENT DOCUMENTS

2016/0241934 A1* 8/2016 Harrison .............. H04N 21/435
2017/0004821 A1* 1/2017 Hirano .................... G10L 13/04
2017/0155964 A1 6/2017 Oztaskent et al.

FOREIGN PATENT DOCUMENTS

| KR | 10-1343488 B1 | 12/2013 |
| KR | 10-2014-0000754 A | 1/2014 |
| KR | 10-2015-0046950 A | 5/2015 |
| KR | 10-2015-0127238 A | 11/2015 |

* cited by examiner

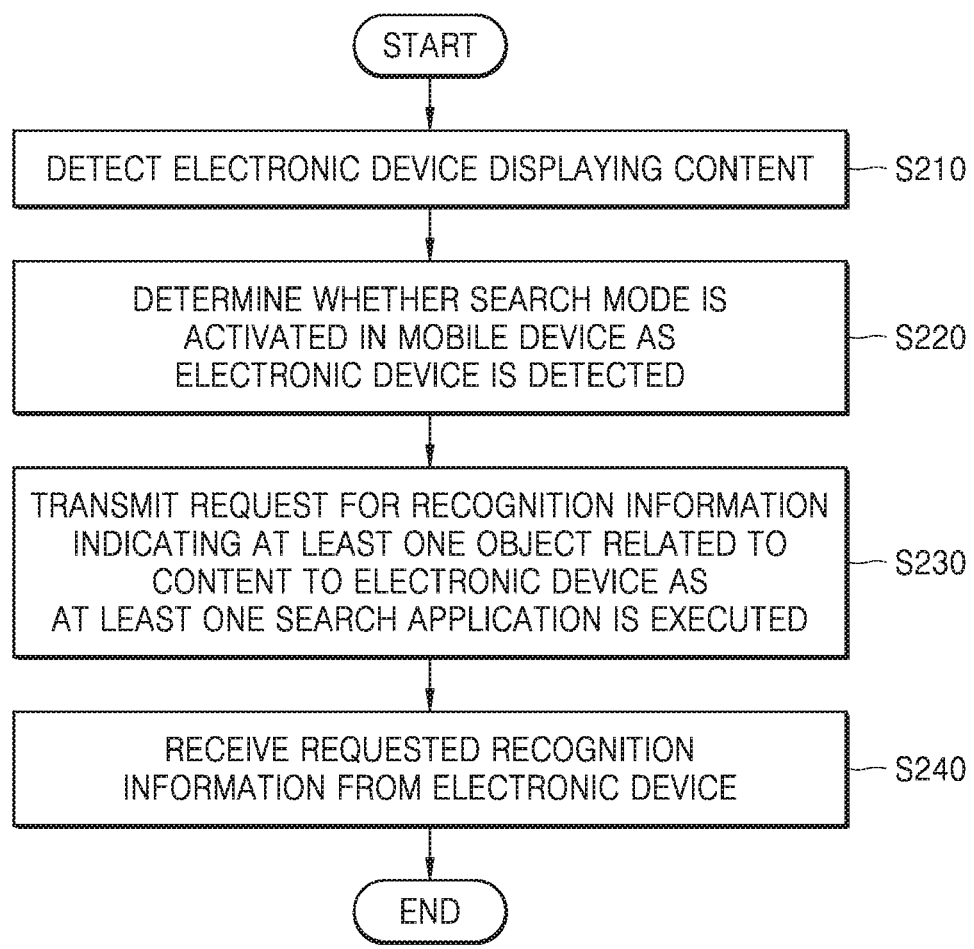

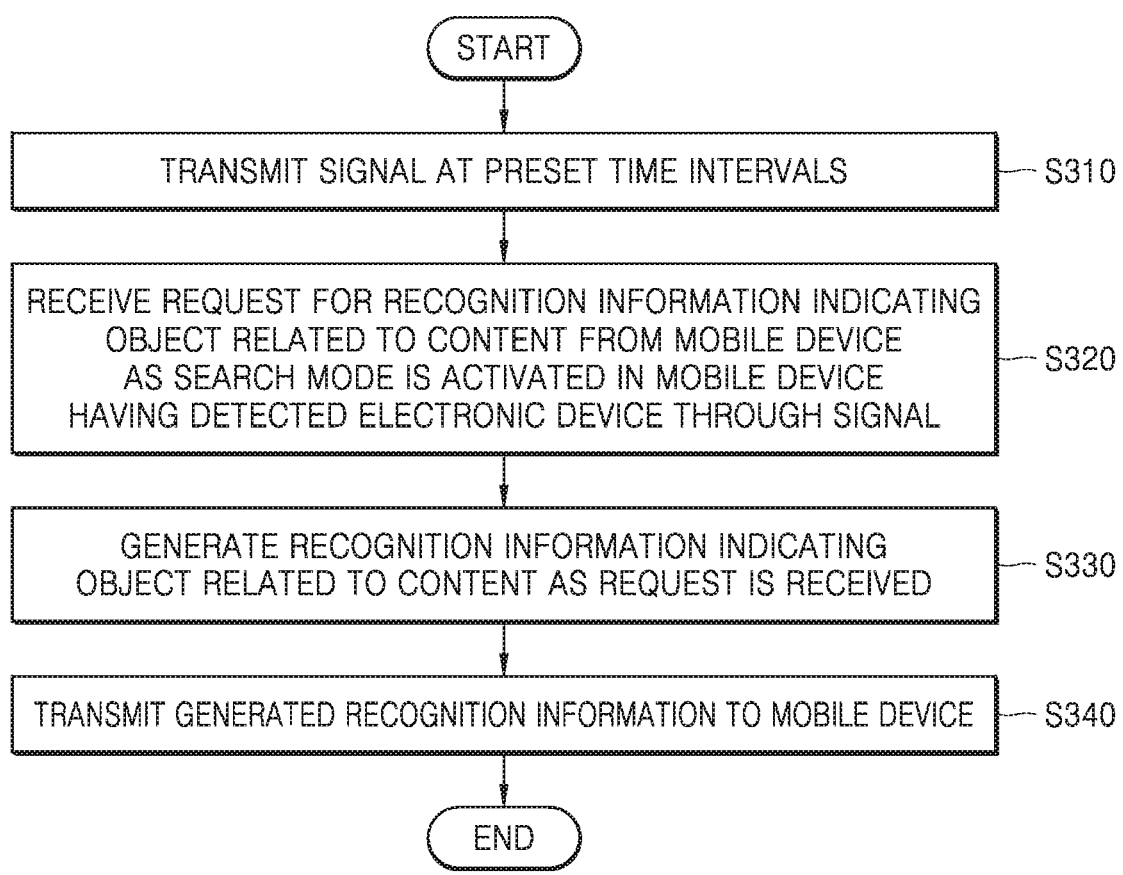

METHOD AND DEVICE FOR PROVIDING INFORMATION ON CONTENT

TECHNICAL FIELD

The present disclosure relates to a method of providing information about content, a device for providing information about content, and a computer-readable recording medium having recorded thereon a program for executing the method of providing information about content.

BACKGROUND ART

With development of information technology (IT), various applications for providing information to users have been developed, such that users may be provided with an environment where they easily search for desired information. In particular, various search engines have been developed to offer a user interface for searching for various objects over the Internet to the users.

With existing search engines, however, the user has to directly input a name of an object about which information the user needs, and thus, when the user does not recognize the object, the user may not obtain the information about the object. Especially when the user needs to obtain information about an object included in content while watching the content, the user may miss an information search point unless the object is recognized in advance, thus failing to find desired information at the right time. Therefore, a need has emerged for a technique for recognizing an object about which information the user desires to search for at a desired time and providing a result of recognition to the user.

DESCRIPTION OF EMBODIMENTS

Technical Problem

Provided are a method and device for providing information about content in which recognition information indicating an object related to content is provided to a user at a time when the user watches the content, thereby providing the user with an environment where the user may easily search for the information about the object related to the content.

Solution to Problem

According to an aspect of the present disclosure, a method, performed by a mobile device, of providing information about content includes detecting an electronic device displaying the content, determining whether at least one search application is executed on the mobile device, as the electronic device is detected, transmitting a request for recognition information indicating at least one object related to the content to the electronic device, as the at least one search application is executed, and receiving the requested recognition information from the electronic device.

BRIEF DESCRIPTION OF DRAWINGS

FIG. 2 is a flowchart of a method, performed by a mobile device, of providing information about content, according to an embodiment.

FIG. 3 is a flowchart of a method, performed by an electronic device, of providing information about content, according to an embodiment.

BEST MODE

Figure 1:
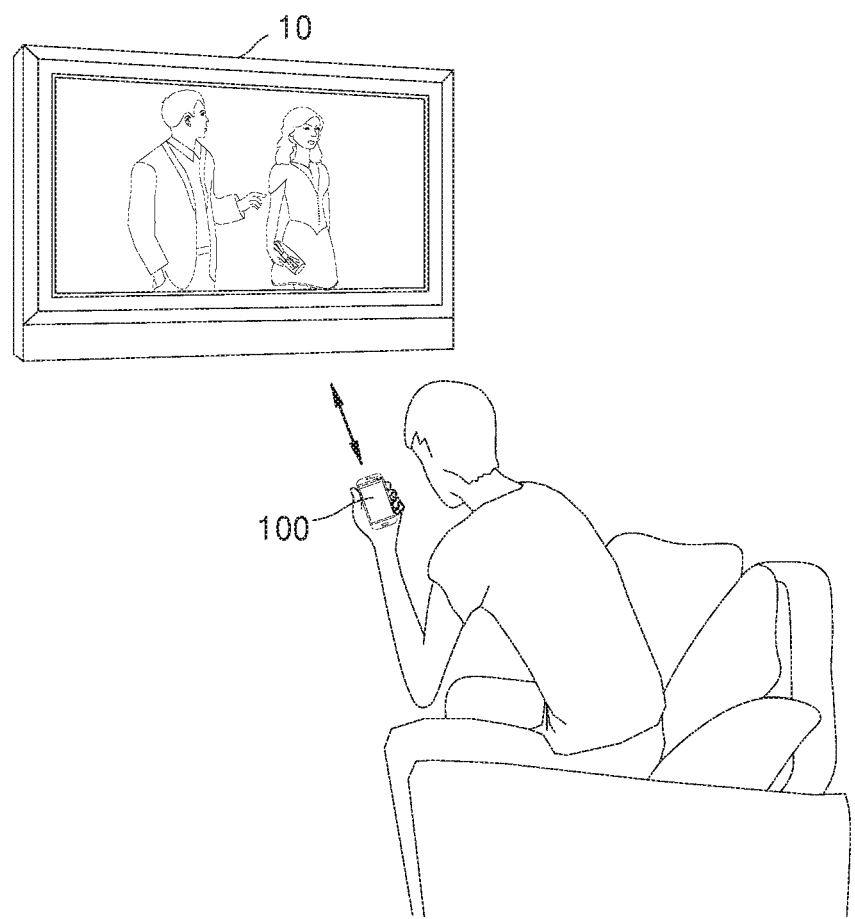
FIG. 1 is a conceptual view for describing a method of providing information about content in an electronic device and a mobile device, according to an embodiment.

According to an embodiment, a method, performed by a mobile device, of providing information about content includes detecting an electronic device displaying the content, determining whether at least one search application is executed on the mobile device, as the electronic device is detected, transmitting a request for recognition information indicating at least one object related to the content to the electronic device, as the at least one search application is executed, and receiving the requested recognition information from the electronic device.

According to an embodiment, in the method of providing the information about content, the method being performed by the mobile device, the determining includes determining whether a search mode of the search application is activated, based on at least one of a state of a search window to which a search word is input or a state of an input menu for inputting the search word in the at least one search application.

According to an embodiment, the method, performed by the mobile device, of providing the information about content further includes displaying the received recognition information on a preset region on a screen of the mobile device, where at least one search application is displayed.

According to an embodiment, the method, performed by the mobile device, of providing the information about content further includes classifying the received recognition information according to a category of at least one object related to the content and displaying the classified recognition information on a screen of the mobile device.

According to an embodiment, the method, performed by the mobile device, of providing the information about content further includes arranging the recognition information based on at least one of previously stored preference information of a user of the mobile device or a type of the at least one search application and displaying the arranged recognition information on the screen of the mobile device.

According to an embodiment, the method, performed by the mobile device, of providing the information about content further includes transmitting the received recognition information to another device connected with the mobile device.

According to an embodiment, a method, performed by an electronic device, of providing information about content includes transmitting, by the electronic device displaying the content, a signal at preset time intervals, receiving a request for recognition information indicating an object related to the content from a mobile device, as at least one search application is executed on the mobile device having detected the electronic device through the signal, generating the recognition information indicating the object related to the content upon receiving the request, and transmitting the generated recognition information to the mobile device.

According to an embodiment, in the method of providing information about content, the method being performed by the electronic device, the generating of the recognition information includes recognizing the object related to the content based on at least one of a captured image of a screen on which the content is output or metadata of the content.

According to an embodiment, a method, performed by a mobile device, of providing information about content includes detecting an electronic device displaying the content, determining whether a search mode is activated in the mobile device, as the electronic device is detected, and receiving, from the electronic device, recognition information indicating at least one object related to the content, when determining that the search mode is activated in the mobile device.

According to an embodiment, the method, performed by the mobile device, of providing information about content further includes transmitting a request for the recognition information to the electronic device, when the search mode is activated in the mobile device.

According to an embodiment, in the method of providing information about content, the method being performed by the mobile device, the determining of whether the search mode is activated includes determining whether the search mode is activated in the mobile device, based on at least one of a state of a search window to which a search word is inputtable, or a state of an input menu for inputting the search word.

According to an embodiment, a mobile device for providing information about content includes a communicator configured to detect an electronic device through a signal transmitted from the electronic device configured to display the content, a processor configured to determine whether at least one search application is executed on the mobile device, as the electronic device is detected, and an output unit on which an execution screen of the at least one search application is displayed, in which the communicator is configured to transmit a request for recognition information indicating at least one object related to the content to the electronic device, as the at least one search application is executed, and receive the requested recognition information from the electronic device.

According to an embodiment, an electronic device for providing information about content includes a display unit on which the content is displayed, a communicator configured to transmit a signal at preset time intervals, receive a request for recognition information indicating an object related to the content from a mobile device, as at least one search application is executed on the mobile device having detected the electronic device through the signal, and a controller configured to generate the recognition information indicating the object related to the content upon receiving the request, in which the communicator is configured to transmit the generated recognition information to the mobile device.

MODE OF DISCLOSURE

Terms used herein will be described in brief, and the disclosure will be described in detail.

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the present disclosure should be defined not by the simple names of the terms but by the meaning of the terms and the contents throughout the present disclosure.

Throughout the entirety of the specification of the present disclosure, if it is assumed that a certain part includes a certain component, the term 'including' means that a corresponding component may further include other components unless a specific meaning opposed to the corresponding component is written. The term used in the embodiments such as "unit" or "module" indicates a unit for processing at least one function or operation, and may be implemented in hardware, software, or in a combination of hardware and software.

Hereinafter, embodiments of the present disclosure will be described in detail with reference to the attached drawings to allow those of ordinary skill in the art to easily carry out the embodiments. However, the present disclosure may be implemented in various forms, and are not limited to the embodiments described herein. To clearly describe the present disclosure, parts that are not associated with the description have been omitted from the drawings, and throughout the specification, identical reference numerals refer to identical parts.

FIG. 1 is a conceptual view for describing a method of providing information about content in an electronic device 10 and a mobile device 100, according to an embodiment.

Referring to FIG. 1, the electronic device 10 may receive content from an external device. For example, the electronic device 10 may receive content from at least one of a broadcasting station server, a set-top box, or a web server, which is merely an example, and the external device is not limited to the example.

Throughout the specification, 'content' may mean digital information provided over a wired/wireless communication network. The content according to an embodiment of the present disclosure may include, but not limited to, video content, still image content (e.g., a photo, a drawing, etc.), text content (e.g., a web page, etc.), audio content (e.g., music, radio broadcasting, etc.), and so forth-.

The electronic device 10 may display received content. For example, the electronic device 10 may display content received from a set channel or a user-selected channel.

Meanwhile, the electronic device 10 according to an embodiment may periodically transmit a signal to allow the mobile device 100 located around the electronic device 10 to detect the electronic device 10. The mobile device 100 may receive the signal transmitted from the electronic device 10 to identify that the electronic device 10 is located around the mobile device 100.

As the mobile device 100 according to an embodiment detects the electronic device 10, the mobile device 100 may determine whether a search mode is activated in the mobile device 100. For example, based on at least one of whether an application having a search function is executed, a state of a search window to which a search word is inputtable, or a state of an input menu for inputting the search word, the mobile device 100 may determine whether the search mode is activated. Herein, the state of the input menu may include whether a keyboard menu is displayed, a voice command is in a reception wait state, etc., which is merely an example, and the state of the input menu is not limited to the example.

When the mobile device 100 determines that the search mode is activated, the mobile device 100 may request the electronic device 10 to provide recognition information indicating at least one object related to the content displayed on the electronic device 10.

Herein, the recognition information may include information about at least one of a title of channel content of the content displayed on the electronic device 10, a storyline of the content, a character in the content, or a product or a place in the content, which is merely an example, and the recognition information is not limited to the example.

The mobile device 100 according to an embodiment may receive recognition information from the electronic device 10 in response to the request. The mobile device 100 may display the received recognition information on a screen. A method, performed by the mobile device 100, of displaying the recognition information on the screen will be described later in more detail with reference to FIGS. 7 through 19.

FIG. 2 is a flowchart of a method, performed by the mobile device 100, of providing information about content, according to an embodiment.

In operation S210, the mobile device 100 may detect an electronic device that displays content.

The mobile device 100 according to an embodiment may detect the electronic device 10 by receiving a signal periodically transmitted from the electronic device 10. For example, the mobile device 100 may detect the electronic device 10 by receiving a Bluetooth Low Energy (BLE) advertising packet periodically transmitted from the electronic device 10. However, this is merely an example, and the signal periodically transmitted from the electronic device 10 is not limited to the BLE advertising packet.

In operation S220, as the mobile device 100 detects the electronic device 10, the mobile device 100 may determine whether the search mode is activated in the mobile device 100. Herein, at least one application having a search function capable of searching for information about content may be previously installed in the mobile device 100. When at least one search word is input to an application having a search function, the mobile device 100 may obtain and display data related to the search word through a web server.

By identifying metadata of the application, the mobile device 100 according to an embodiment may determine whether the currently executed application is capable of performing the search function. For example, the mobile device 100 may identify identification information of the currently executed application by identifying the metadata of the currently executed application. When the identified identification information of the application is included in a previously stored application list, the mobile device 100 may determine that an application capable of performing the search function is currently executed on the mobile device 100. Herein, the application capable of performing the search function may be an application belonging to a category classified as utility, shopping, etc., in an application market. When an icon (e.g., a search button, an icon in the shape of a magnifying glass, etc.) indicating the search function is displayed on a screen where the application is executed and a start screen of the application, the mobile device 100 may identify the currently executed application as the application capable of performing the search function.

According to another embodiment, based on at least one of the state of the search window to which a search word is inputtable, or the state of the input menu for inputting the search word, the mobile device 100 may determine whether the search mode is activated. For example, the mobile device 100 may determine that the search mode is activated, when the search window or the input menu is displayed on the screen. In another example, to more clearly determine whether the user of the mobile device 100 intends to search for information about content, the mobile device 100 may further determine whether a cursor, etc., is displayed on the search window or a keyboard menu for inputting a text is displayed on the screen of the mobile device 100. Herein, the mobile device 100 may determine whether the keyboard menu is displayed, by performing screen recognition or detecting a broadcast event indicating that the keyboard menu is an on state from an operating system (OS), but a way for the determination is not limited to this example.

The above-described example is merely an embodiment, and the method, performed by the mobile device 100, of determining whether the search mode is activated is not limited to the above-described example.

In operation S230, as at least one search application is executed, the mobile device 100 may transmit a request for recognition information indicating at least one object related to the content to the electronic device 10.

As the at least one search application is executed, the mobile device 100 according to an embodiment may determine that the user of the mobile device 100 intends to search for the recognition information of the content displayed on the electronic device 10. Herein, the recognition information may include at least one of a text, an image, or a moving image indicating the at least one object related to the content. For example, the recognition information may include at least one of the title of the content, the channel in which the content is provided, a keyword and an image indicating the object included in the screen on which the content is output, or a keyword and an image indicating the object related to the object included in the screen on which the content is output.

According to another embodiment, the mobile device 100 may perform a process of connecting to the electronic device 10 before the mobile device 100 requests the recognition information. For example, as the at least one search application is executed, the mobile device 100 may transmit a connection request message for requesting connection from the electronic device 10. As the mobile device 100 receives a response message with respect to the connection request message, the mobile device 100 may transmit a request for the recognition information to the electronic device 10.

In operation S240, the mobile device 100 may receive the requested recognition information from the electronic device 10.

The mobile device 100 according to an embodiment may display the recognition information received from the electronic device 10 on a preset region of a screen of the mobile device 100, where the at least one search application is executed. Herein, it is assumed that the at least one search application is displayed on the screen of the mobile device 100.

For example, the mobile device 100 may display the received recognition information around the search window of the at least one search application displayed on the screen. The recognition information received by the mobile device 100 may include a name of a character of the content currently displayed on the electronic device 10, a title of the content, and information about a brand of a bag worn by the character. Thus, the mobile device 100 may display the name of the character of the content, the title of the content, and the information about the brand of the bag worn by the character around the search window.

According to another embodiment, the mobile device 100 may transmit the recognition information received from the electronic device 10 to an external device. For example, the mobile device 100 may transmit the recognition information received from the electronic device 10 to another device with which connection of the mobile device 100 is established.

FIG. 3 is a flowchart of a method, performed by the electronic device 10, of providing information about content, according to an embodiment.

In operation S310, the electronic device 10 may transmit a signal. For example, the signal transmitted by the electronic device 10 may include a beacon signal, a pilot signal, etc. The electronic device 10 may transmit the signal at preset time intervals, but this is merely an example, and a method, performed by the electronic device 10, of transmitting a signal is not limited to the example.

The electronic device 10 according to an embodiment may transmit, at preset time intervals, a beacon signal indicating that the electronic device 10 operates, to perform connection with another device around the electronic device 10, in a state where a screen of the electronic device 10 is turned on. For example, the electronic device 10 may transmit the BLE advertising packet at preset time intervals. However, this is merely an example, and the signal transmitted from the electronic device 10 is not limited to the BLE advertising packet, and various signals such as BLE, WiFi, Bluetooth-, etc., may be transmitted.

According to another embodiment, the electronic device 10 may transmit a beacon signal both when the screen is turned on and when the screen is turned off.

In operation S320, as the search mode is activated in the mobile device 100 having detected the electronic device 10, the electronic device 10 may receive a request for recognition information indicating an object related to the content from the mobile device 100.

For example, the mobile device 100 located within a preset distance range from the electronic device 10 may detect the beacon signal transmitted from the electronic device 10. The mobile device 100 may determine from the beacon signal transmitted from the electronic device 10 that the electronic device 10 is located within a predetermined distance.

The electronic device 10 according to an embodiment may receive the request for the recognition information from the mobile device 100, when at least one search application is executed on the mobile device 100.

As described in relation to operation S310, the electronic device 10 may transmit the beacon signal both when the screen is turned on and when the screen is turned off. In this case, when the mobile device 100 receives the beacon signal from the electronic device 10, the mobile device 100 may determine whether the screen of the electronic device 10 is turned on and transmit the request for the recognition information indicating the object related to the content to the electronic device 10. For example, the mobile device 100 may transmit a message inquiring about a power state of the screen to the electronic device 10 or determine based on power state information of the screen, included in the beacon signal, whether the screen of the electronic device 10 is turned on.

According to another embodiment, the electronic device 10 may process a process of connection with the mobile device 100 before the electronic device 10 receives the request for the recognition information from the mobile device 100. For example, the electronic device 10 may receive a connection request message from the mobile device 100 having detected the electronic device 10 through the beacon signal. Thus, the electronic device 10 may establish a session with the mobile device 100 by transmitting a response message with respect to the connection request message to the mobile device 100. After the session is established, the electronic device 10 may receive the request for the recognition information from the mobile device 100.

In operation S330, as the electronic device 10 receives the request, the electronic device 10 may generate the recognition information indicating the object related to the content.

The electronic device 10 according to an embodiment may recognize an object included in a captured image of the screen on which the content is currently output and generate the recognition information. For example, the electronic device 10 may recognize the object currently displayed on the screen by using optical character recognition (OCR), fingerprint technology, etc. In another example, the electronic device 10 may recognize the object by comparing an image of the object displayed on the screen with a database storing images of a plurality of objects. In another example, the electronic device 10 may also recognize the object by using deep learning, etc., based on information about the object, learned from previously output content.

The electronic device 10 may also generate the recognition information from metadata of the currently output content. For example, the electronic device 10 may generate the recognition information including the title of the content, a channel through which the content is provided, etc., by parsing the metadata of the content. In another example, the electronic device 10 may generate the recognition information such as a title of a song, etc., from voice information of the content through voice recognition of the content.

In operation S340, the electronic device 10 may transmit the generated recognition information to the mobile device 100.

The electronic device 10 according to an embodiment may broadcast the generated recognition information as the recognition information of the currently displayed content is generated. According to another embodiment, the electronic device 10 may transmit the recognition information to the mobile device 100 through a session established in the process of connection with the mobile device 100.

Figure 4A:
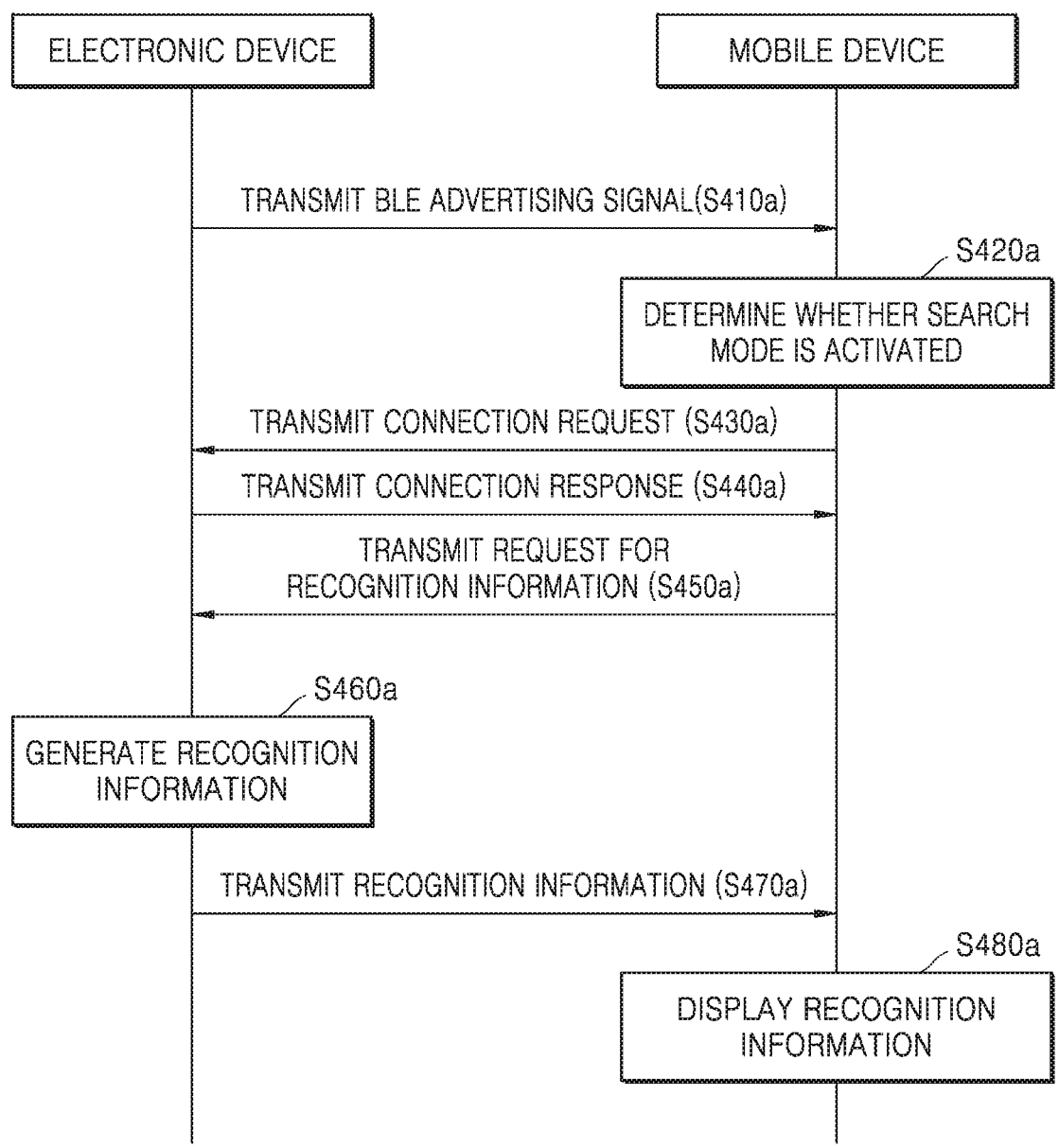
FIGS. 4A and 4B are flowcharts of a method, performed by a mobile device and an electronic device, of providing information about content, according to an embodiment.
Figure 4B:
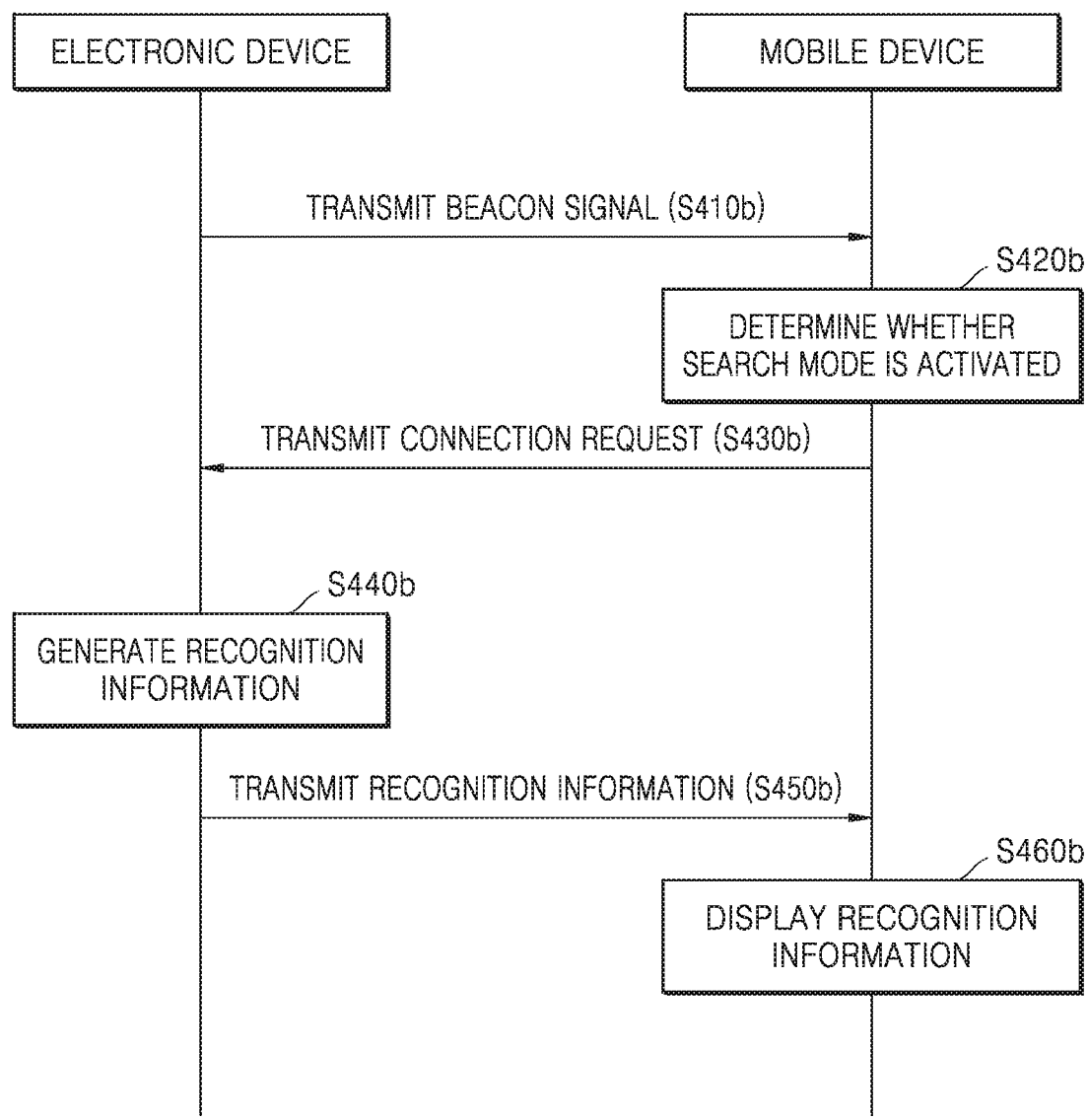

FIGS. 4A and 4B are flowcharts of a method, performed by the mobile device 100 and the electronic device 10, of providing information about content, according to an embodiment.

In an embodiment of FIG. 4A, the mobile device 100 is assumed to transmit information about content from the electronic device 10 through a BLE data channel.

In operation S410a, the electronic device 10 may transmit a BLE advertising signal. Herein, the BLE advertising signal may include at least one of identification information of the electronic device 10 or state information of the electronic device 10 (e.g., a power state of a screen).

In operation S420a, as the mobile device 100 determines based on the BLE advertising signal received from the electronic device 10 that the electronic device 10 is located within a specific distance, the mobile device 100 determines whether the search mode of the mobile device 100 is activated. Herein, a method of determining whether the search mode is activated may correspond to the above description made with reference to FIG. 2.

Meanwhile, the mobile device 100 may determine from the BLE advertising signal that the electronic device 10 is located within a predetermined distance from the mobile device 100. The mobile device 100 may determine from the BLE advertising signal that the electronic device 10 is in a power-on state. The mobile device 100 may also determine from the BLE advertising signal that the electronic device 10 currently displays the content.

In operation S430a, as the search mode is activated, the mobile device 100 may transmit a connection request to the electronic device 10. Herein, the connection request may include identification information of the electronic device 10.

In operation S440a, as the electronic device 10 receives the connection request from the mobile device 100, the electronic device 10 may transmit a connection response with respect to the connection request to the mobile device 100.

In operation S450a, as the mobile device 100 receives the connection response, a BLE data channel is formed through which the mobile device 100 transmits a request for recognition information indicating an object related to the content to the electronic device 10.

In operation S460a, the electronic device 10 may generate the recognition information indicating the object related to the content displayed on the electronic device 10 in response to the request from the mobile device 100.

The electronic device 10 according to an embodiment may capture the screen on which the content is displayed and recognize an object of a captured image, thus generating the recognition information. According to another embodiment, the electronic device 10 may generate the recognition information of the content based on the metadata of the content.

In operation S470a, the electronic device 10 may transmit the generated recognition information to the mobile device 100.

The electronic device 10 according to an embodiment may broadcast the generated recognition information. Thus, the mobile device 100 located within a preset range from the electronic device 10 may receive the recognition information broadcast from the electronic device 10. According to another embodiment, the electronic device 10 may transmit the recognition information to the mobile device 100 through a session previously established in the process of connection with the mobile device 100.

In operation S480a, the mobile device 100 may display the received recognition information.

In an embodiment of FIG. 4B, the mobile device 100 is assumed to transmit content information through a BLE advertising signal from the electronic device 10. In operation S410b, the electronic device 10 may transmit a beacon signal at preset time intervals. The beacon signal may be, but not limited to, a BLE advertising signal. Herein, the beacon signal may include at least one of identification information of the electronic device 10 or state information of the electronic device 10 (e.g., a power state of a screen). The preset time interval may be, for example, less than or equal to 120 ms.

In operation S420b, as the mobile device 100 determines based on the beacon signal received from the electronic device 10 that the electronic device 10 is located within a specific distance, the mobile device 100 determines whether the search mode of the mobile device 100 is activated. Herein, a method of determining whether the search mode is activated may correspond to the above description made with reference to FIG. 2.

In operation S430b, as the search mode is activated, the mobile device 100 may transmit a request for recognition information indicating an object related to the content to the electronic device 10. Herein, the request for the recognition information may include identification information of the mobile device 100.

In operation S440b, the electronic device 10 may generate the recognition information indicating the object related to the content displayed on the electronic device 10 in response to the request from the mobile device 100.

The electronic device 10 according to an embodiment may capture the screen on which the content is displayed and recognize an object of a captured image, thus generating the recognition information. According to another embodiment, the electronic device 10 may generate the recognition information of the content based on the metadata of the content.

In operation S450b, the electronic device 10 may transmit the generated recognition information to the mobile device 100. A signal for transmitting information may be, but not limited to, a BLE advertising signal.

The electronic device 10 according to an embodiment may broadcast the generated recognition information. Thus, the mobile device 100 located within a preset range from the electronic device 10 may receive the recognition information broadcast from the electronic device 10. According to another embodiment, the electronic device 10 may transmit the recognition information to the mobile device 100 through a session previously established in the process of connection with the mobile device 100.

Meanwhile, the recognition information transmitted by the electronic device 10 to the mobile device 100 may include the identification information of the electronic device 10.

In operation S460b, the mobile device 100 may display the received recognition information.

Figure 5:
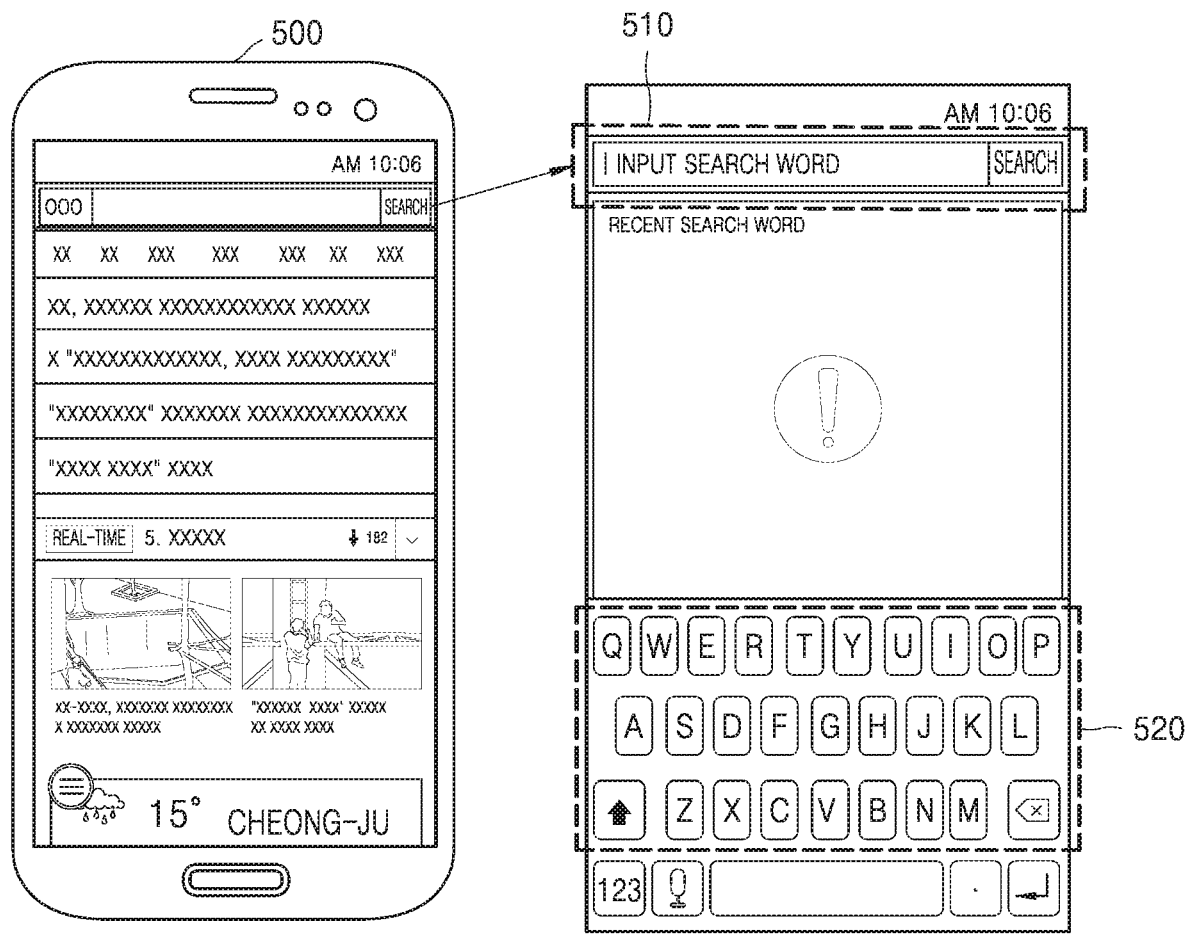
FIG. 5 is a view for describing a method, performed by a mobile device, of determining whether to activate a search mode for a search application, according to an embodiment.

FIG. 5 is a view for describing a method, performed by a mobile device 500, of determining whether to activate a search mode for a search application, according to an embodiment.

As the mobile device 500 according to an embodiment detects the electronic device 10 that displays the content, the mobile device 500 may determine whether a search mode of a search application is activated.

Referring to FIG. 5, the mobile device 500 may determine whether a currently executed application is a search application by parsing metadata of the currently executed application.

The mobile device 500 may determine whether the search mode of the search application is activated, when the search application is currently executed. For example, the mobile device 500 may determine whether a cursor is currently executed on a search window 510 of the search application. The mobile device 500 may determine that the search mode is activated, when the cursor is currently executed on the search window 510.

In another example, the mobile device 500 may determine whether a keyboard menu 520 for inputting a text to the search window 510 is currently executed. The mobile device 500 may determine that the search mode is activated, when the keyboard menu 520 is currently activated.

As the search mode is activated, the mobile device 500 according to an embodiment may transmit a request for recognition information indicating an object related to the content to the electronic device.

Figure 6:
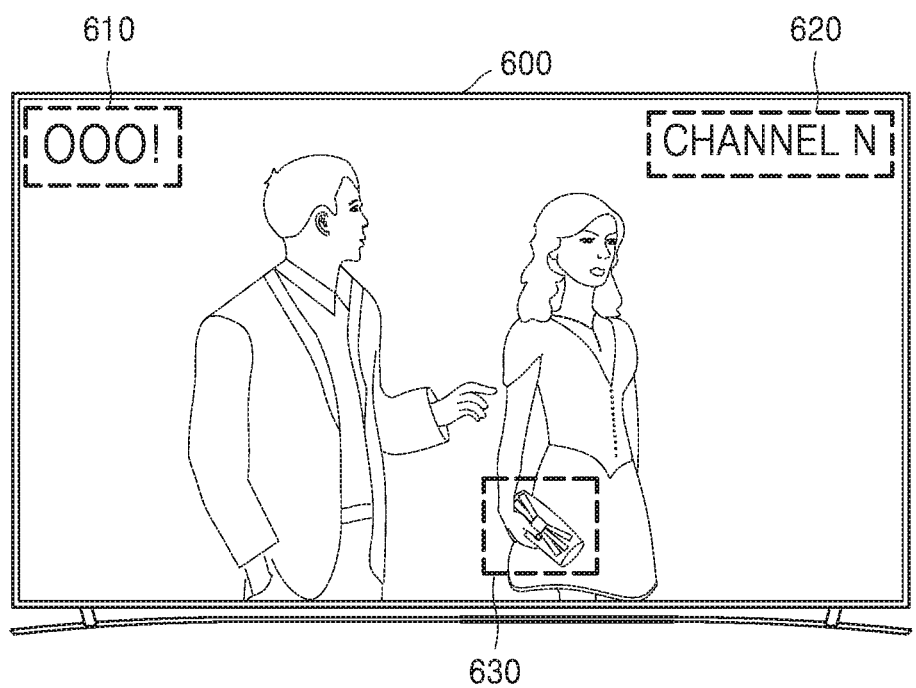
FIG. 6 is a view for describing a method, performed by an electronic device, of generating recognition information of content, according to an embodiment.

FIG. 6 is a view for describing a method, performed by an electronic device 600, of generating recognition information of content, according to an embodiment.

Referring to FIG. 6, as the electronic device 600 receives the request for the recognition information indicating the object related to the content from the mobile device, the electronic device 600 may capture a screen on which the content is displayed. The electronic device 600 may recognize an object included in a captured image through an object recognition scheme. Herein, the object recognition scheme may include OCR, a fingerprint technology, deep learning, etc., which is merely an example, and the object recognition scheme is not limited to the example.

For example, the electronic device 600 may recognize a title 610 and a channel number 620 of the content displayed in the captured image through OCR. The electronic device 600 may recognize a brand and a product name of a bag 630 worn by a character displayed on the captured image. The electronic device 600 may generate recognition information including the recognized title 610, channel number 620, and brand and product name of the bag 630 of the content. Meanwhile, this is merely an example, and the recognition information may include information in the form of an image such as an image of the bag 630 as well as information in the form of a text.

In another example, an object related to the object displayed in the captured image may be included in the recognition information. For example, a title of content provided in another channel in the same time zone as the content currently displayed on the screen may be included in the recognition information, as related information of the content currently displayed on the screen.

The electronic device 600 according to an embodiment may transmit the generated recognition information to the mobile device, as the recognition information of the currently displayed content is generated.

Figure 7:
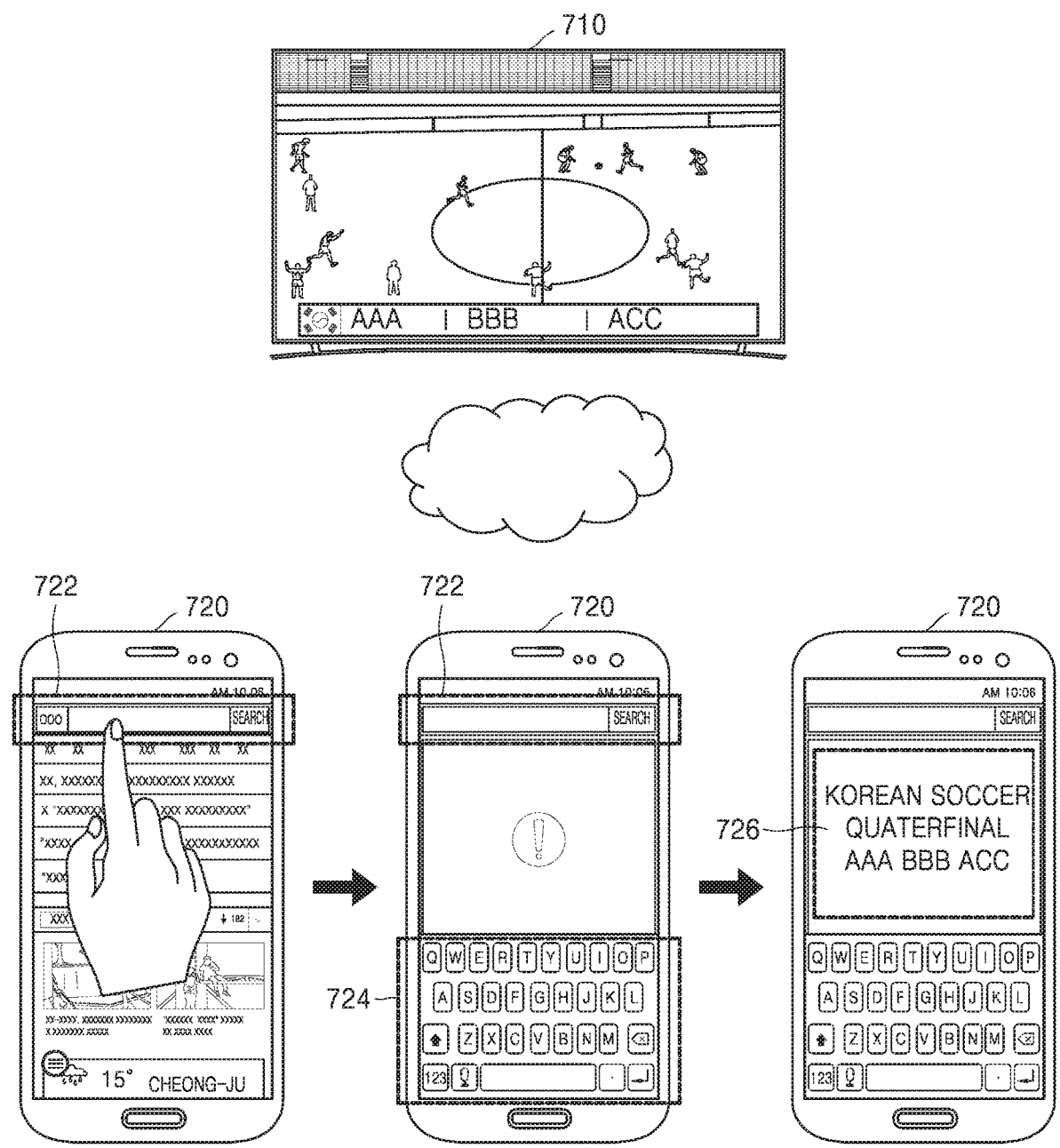
FIG. 7 is a view for describing a method, performed by a mobile device, of displaying recognition information received from an electronic device, according to an embodiment.

FIG. 7 is a view for describing a method, performed by a mobile device 720, of displaying recognition information received from an electronic device 710, according to an embodiment.

Referring to FIG. 7, the mobile device 720 may detect the electronic device 710 that outputs a soccer game program. For example, the mobile device 720 may detect the electronic device 710 through a beacon signal transmitted at preset time intervals from the electronic device 710.

As the mobile device 720 detects the electronic device 710, the mobile device 720 may determine whether a search mode is activated in the mobile device 720. When a user of the mobile device 720 touches a search window 722 of a search application and thus a cursor is currently executed on the search window 722, the mobile device 720 may determine that the search mode is activated. In another example, the mobile device 720 may determine that the search mode is activated, when a keyboard menu 724 for inputting a text to the search window 722 is currently executed.

When the mobile device 720 determines that the search mode is activated, the mobile device 720 may transmit a request for recognition information indicating an object related to content to the electronic device 710. Thus, the electronic device 710 may generate recognition information indicating an object related to the soccer game program that is currently displayed content. For example, the electronic device 710 may capture a screen on which the soccer game program is currently displayed and recognize a soccer player included in a captured image. The electronic device 710 may recognize a game score, country information, etc., included in the captured image. In another example, the electronic device 710 may recognize, from metadata of the soccer game program, a channel through which the soccer game program is provided.

The electronic device 710 may transmit the recognition information indicating the object related to the soccer game program to the mobile device 720. The mobile device 720 may display the received recognition information on a preset region 726 between the search window 722 and the keyboard menu 724.

Figure 8:
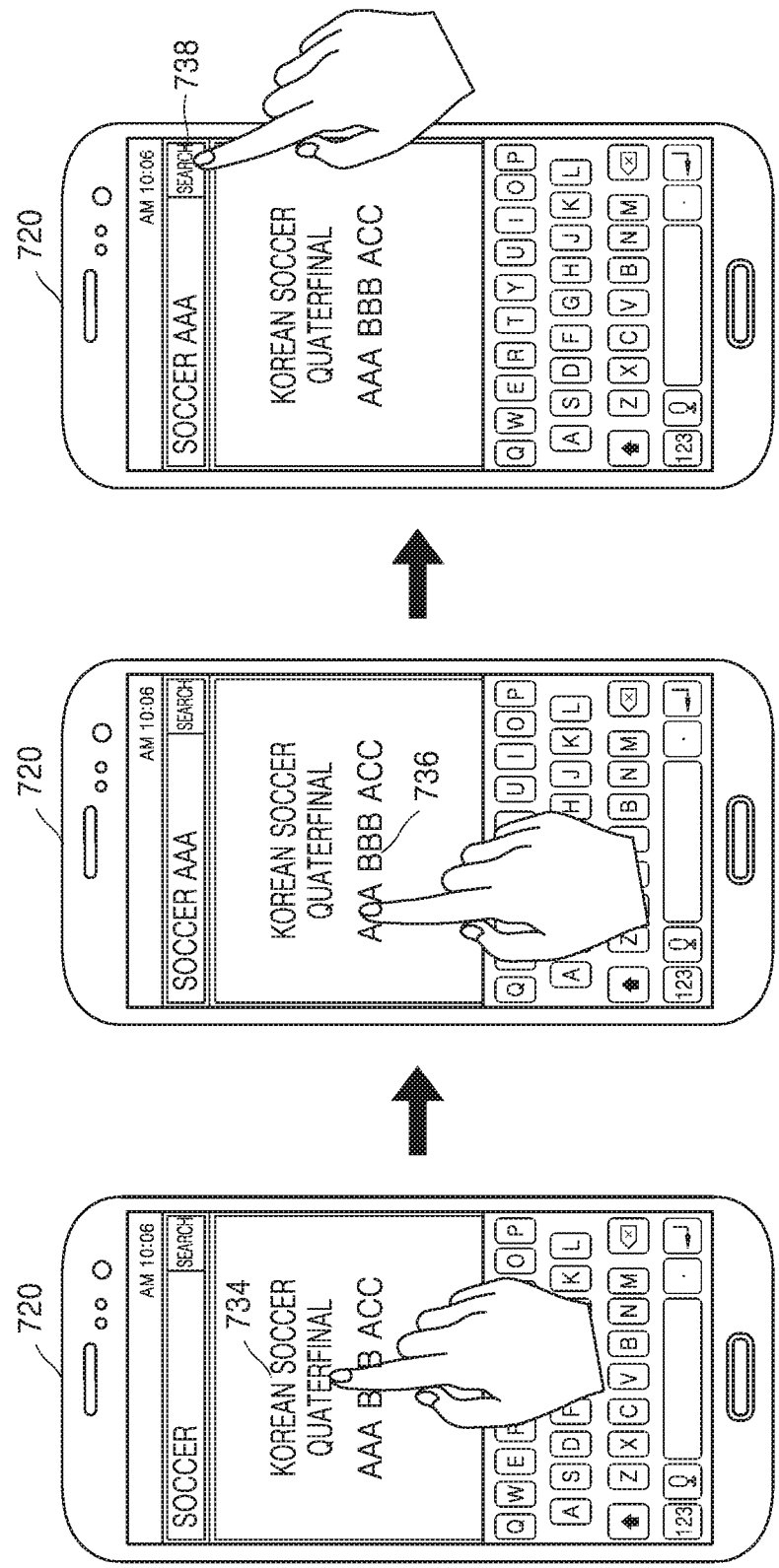
FIG. 8 is a view for describing a method, performed by a mobile device, of inputting recognition information received from an electronic device to a search window, according to an embodiment.

FIG. 8 is a view for describing a method, performed by the mobile device 720, of displaying recognition information received from the electronic device 710, according to an embodiment.

Referring to FIG. 8, the mobile device 720 may receive a user input to select a keyword 734 "soccer" corresponding to an event among respective identification information of a plurality of objects included in recognition information displayed on the screen. Thus, the mobile device 720 may input the keyword 734 "soccer" to the search window.

The mobile device 720 may further receive a user input to select a keyword 736 "AAA" corresponding to a player's name among the respective identification information of the plurality of objects included in the recognition information displayed on the screen. The mobile device 720 may sequentially input a selected keyword on the search window in an order in which the keyword is selected. Thus, the keyword 734 "soccer" and the keyword 736 "AAA" may be sequentially input to the search window.

The mobile device 720 may search for input keywords as the user touches a search icon 738 for requesting a search. Thus, the mobile device 720 may obtain search information about "soccer" and "AAA".

Figure 9:
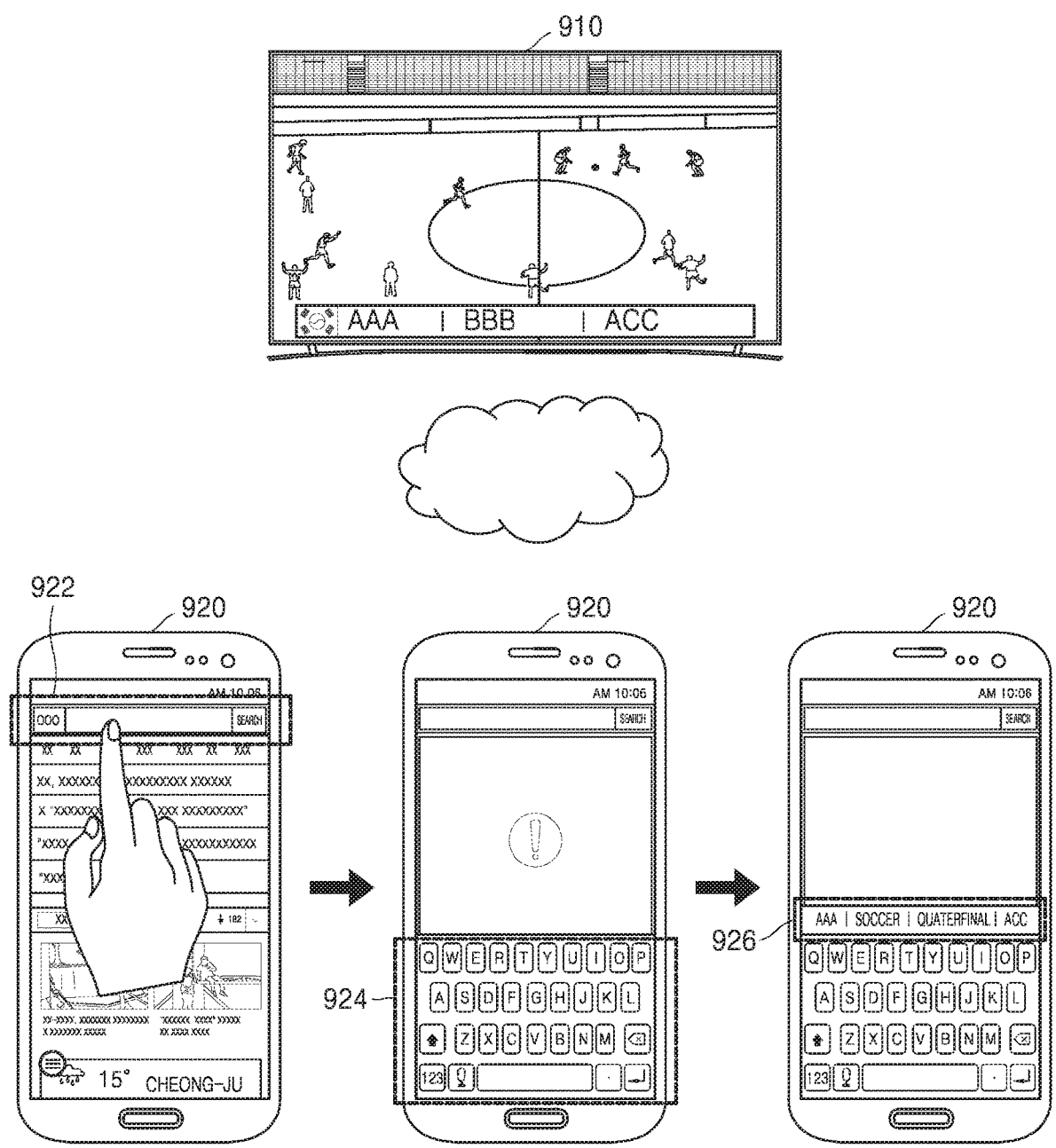
FIG. 9 is a view for describing a method, performed by a mobile device, of displaying recognition information received from an electronic device, according to another embodiment.

FIG. 9 is a view for describing a method, performed by a mobile device 920, of displaying recognition information received from an electronic device 910, according to an embodiment.

Referring to FIG. 9, the mobile device 920 may detect the electronic device 910 that outputs a soccer game program. As the mobile device 920 detects the electronic device 910, the mobile device 920 may determine whether a search window 922 of a search application installed in the mobile device 920 is currently executed, to determine whether a search mode of the search application is activated.

When the mobile device 920 determines that the search mode of the search application is activated, the mobile device 920 may transmit a request for recognition information indicating an object related to content to the electronic device 910. Thus, the mobile device 920 may receive, from the electronic device 910, the recognition information indicating the object related to the soccer game program that is currently displayed content.

The mobile device 920 according to an embodiment may display keywords of the object included in the received recognition information above the keyboard menu 924. For example, the mobile device 920 may display a keyword 926 indicating an event, a soccer player's name, a channel type, etc., above the keyboard menu 924 in the form of a label.

Figure 10:
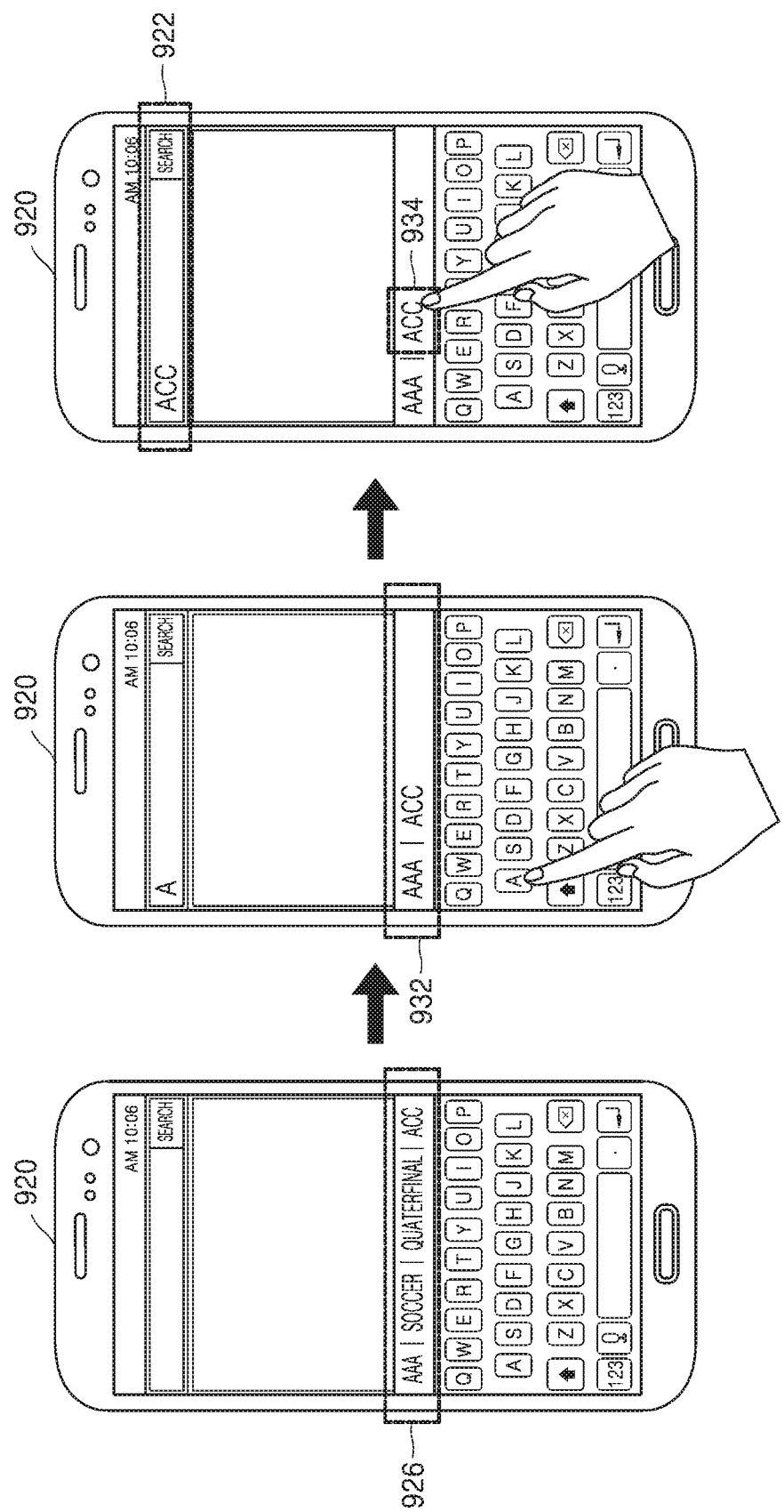
FIG. 10 is a view for describing a method, performed by a mobile device, of inputting recognition information received from an electronic device to a search window, according to another embodiment.

FIG. 10 is a view for describing a method, performed by the mobile device 920, of displaying recognition information received from the electronic device 910, according to another embodiment.

Referring to FIG. 10, the mobile device 920 may display keywords 926 of a plurality of objects included in recognition information above a keyboard menu. The mobile device 920 may select and display some of the keywords 926 of the plurality of respective objects according to a letter selected by the user from the keyboard menu. For example, when the user selects a letter A from the keyboard menu, the mobile device 920 may selectively display "AAA" and "ACC" 932 starting with A above the keyboard menu among the keywords 926 of the plurality of respective objects.

When the user selects "ACC" 934 from the selectively displayed "AAA" and "ACC" 932, the mobile device 920 may input ACC to the search window 922. The mobile device 720 may search for the input keyword ACC 934 as the user touches a search icon (not shown) for requesting a search. Thus, the mobile device 920 may obtain search information about "ACC".

Figure 11:
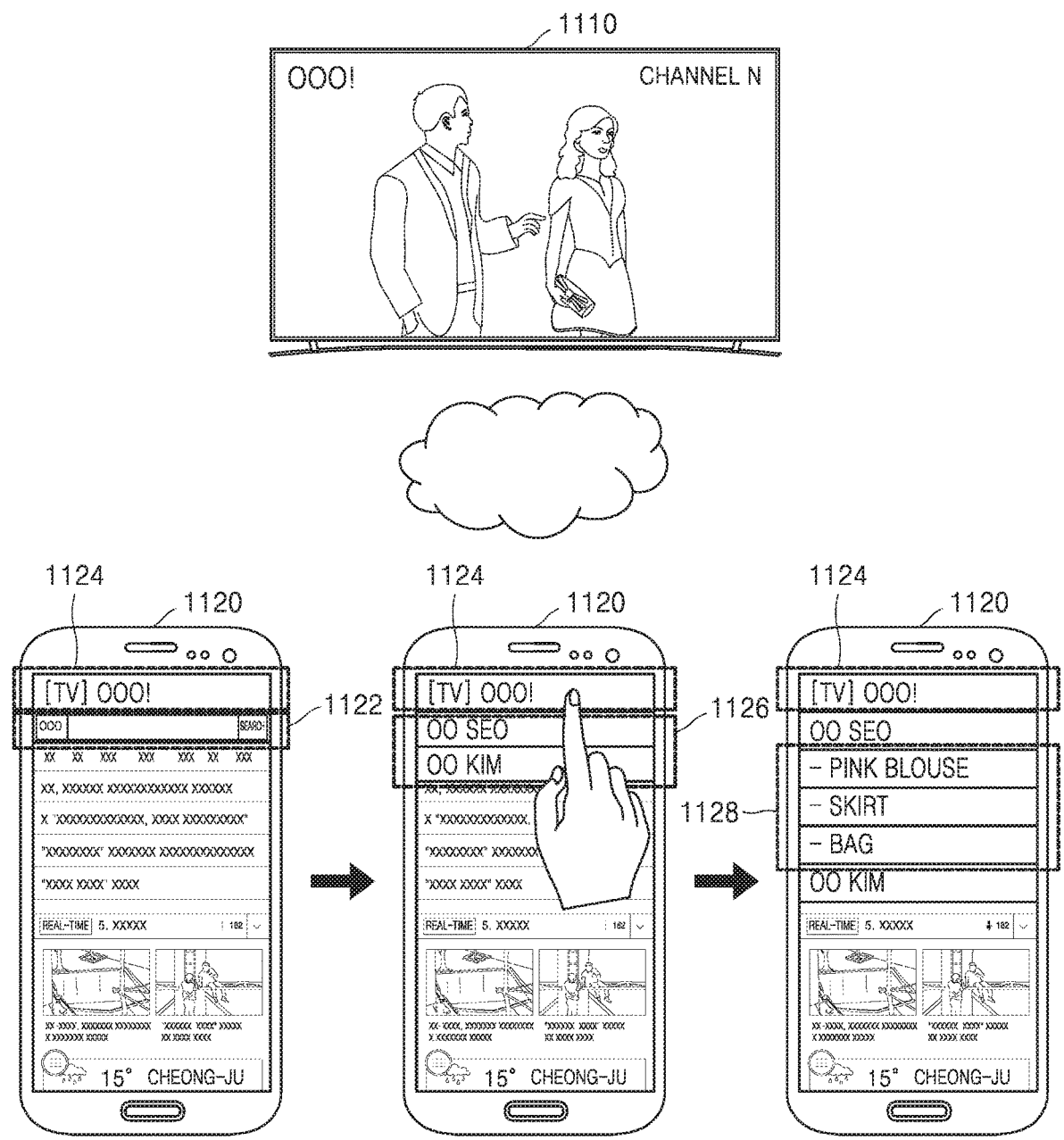
FIG. 11 is a view for describing a method, performed by a mobile device, of displaying recognition information received from an electronic device, according to another embodiment.

FIG. 11 is a view for describing a method, performed by a mobile device 1120, of displaying recognition information received from an electronic device 1110, according to another embodiment.

Referring to FIG. 11, the mobile device 1120 may detect the electronic device 1110 that outputs a drama "OOO". As the mobile device 1120 detects the electronic device 1110, the mobile device 1120 may determine whether a search window 1122 of a search application installed in the mobile device 920 is currently executed, to determine whether a search mode of the search application is activated.

When the mobile device 1120 determines that the search mode of the search application is activated, the mobile device 920 may transmit a request for recognition information indicating an object related to content to the electronic device 1110. Thus, the mobile device 1120 may receive, from the electronic device 1110, the recognition information indicating the object related to the drama "OOO" that is currently displayed content.

The mobile device 1120 according to an embodiment may display a title of a drama, "OOO" 1124, included in the received recognition information above the search menu 1122 as a bar. As the user selects-"OOO"-displayed above the search window 1122, the mobile device 1120 may sequentially display detailed information about the drama "OOO", names 1126 of an actor/actress A and an actor/actress B.

As the user selects the name of the actor/actress A, the mobile device 1120 may further display detailed information about the actor/actress A, included in the recognition information received from the electronic device 1110. For example, the mobile device 1120 may further display keywords 1128 regarding a blouse, jeans, and a bag the actor/actress A wears in the drama "OOO".

The mobile device 1120 according to an embodiment may provide an environment making it easy for the user to find a keyword the user desires to search, by sequentially displaying the recognition information received from the electronic device 1110 according to an input from the user.

Figure 12:
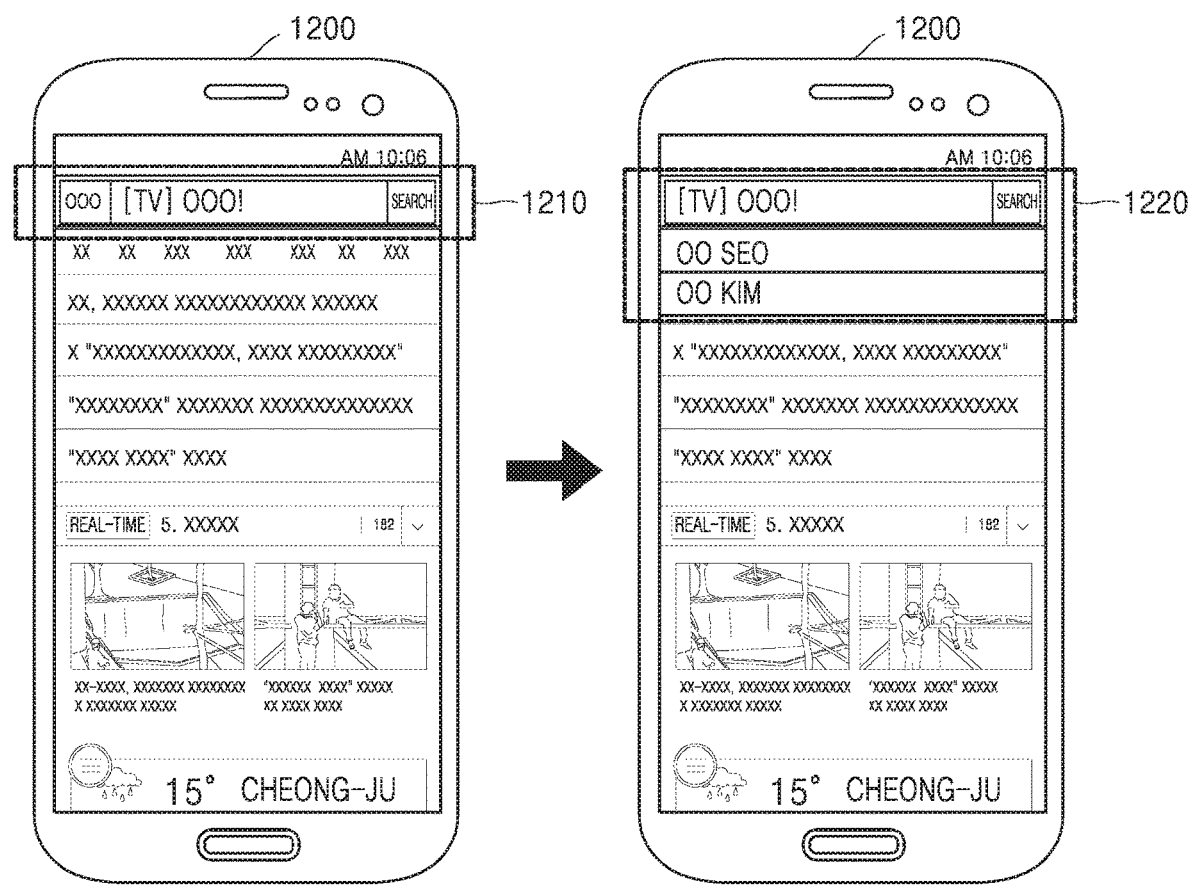
FIG. 12 is a view for describing a method, performed by a mobile device, of displaying recognition information received from an electronic device, according to another embodiment.

FIG. 12 is a view for describing a method, performed by a mobile device 1200, of displaying recognition information received from an electronic device, according to another embodiment.

Referring to FIG. 12, the mobile device 1200 may generate a tab that is separate from a tab in which the search application is currently executed, to display recognition information received from the electronic device. For example, as the mobile device 1200 receives the recognition information from the electronic device, the mobile device 1200 may generate a tab 1220 for performing a search related to the recognition information separately from the tab of the search application in which the search window 1210 is activated. The mobile device 1120 may perform a search with respect to a keyword included in the recognition information by using the separately generated tab 1220.

The mobile device 1200 according to an embodiment may provide, to the user, a result of the research with respect to the recognition information in parallel with the tab of the search application in which the search window 1210 is activated, by generating a separate tab.

Figure 13:
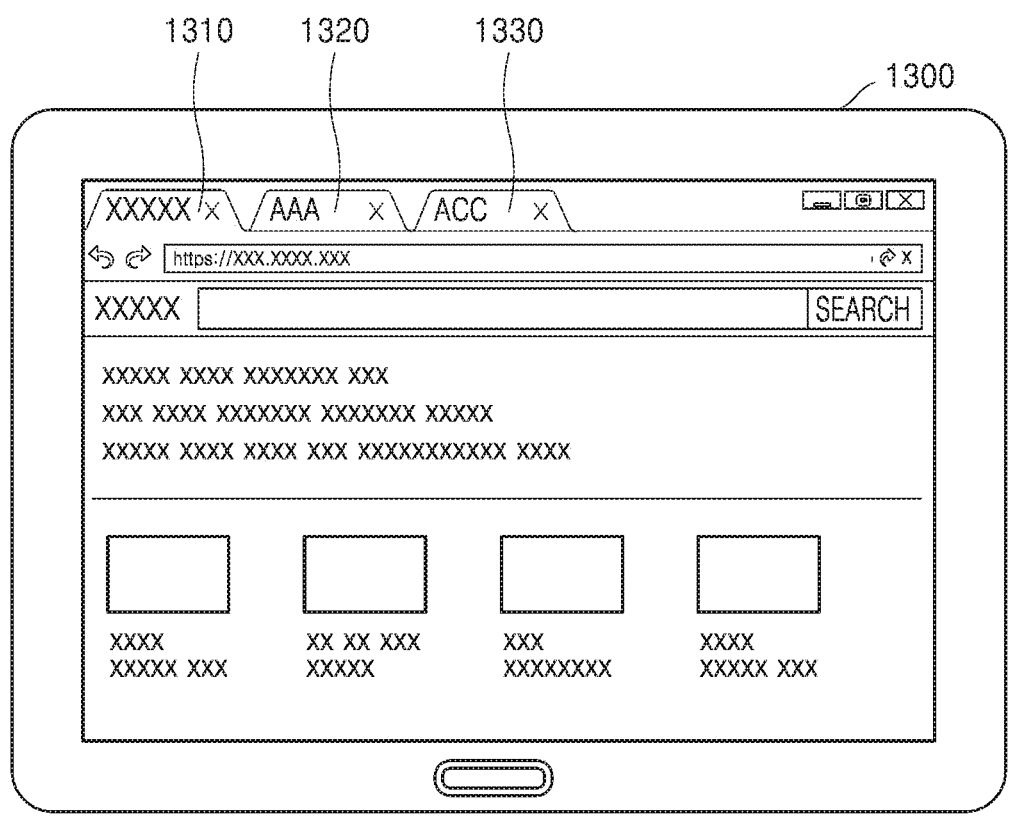
FIG. 13 is a view for describing a method, performed by a mobile device, of displaying recognition information received from an electronic device, according to another embodiment.

FIG. 13 is a view for describing a method, performed by a mobile device 1300, of displaying recognition information received from an electronic device, according to another embodiment.

Referring to FIG. 13, the mobile device 1300 may execute a web page 1310 that provides a search function through a web browser. The mobile device 1300 may transmit a request for recognition information of content displayed on the electronic device to the detected electronic device, as the mobile device 1300 determines that the web page 1310 providing the search function is activated.

As the mobile device 1300 receives the recognition information of the content from the electronic device in response to the request, the mobile device 1300 may provide, through separate tabs 1320 and 1330, information about a result of inputting keywords, included in the recognition information of the content, to the web page that provides the search function. For example, the mobile device 1300 may display, on the screen, the tab 1320 of a resultant page of inputting "AAA" that is one of the keywords to the web page 1310 and the tab 1330 of a resultant page of inputting "ACC" that is another keyword among the keywords to the web page 1310.

Thus, the mobile device 1300 may provide an environment where the user is provided with a search result with respect to the recognition information and a search web page in parallel.

Figure 14:
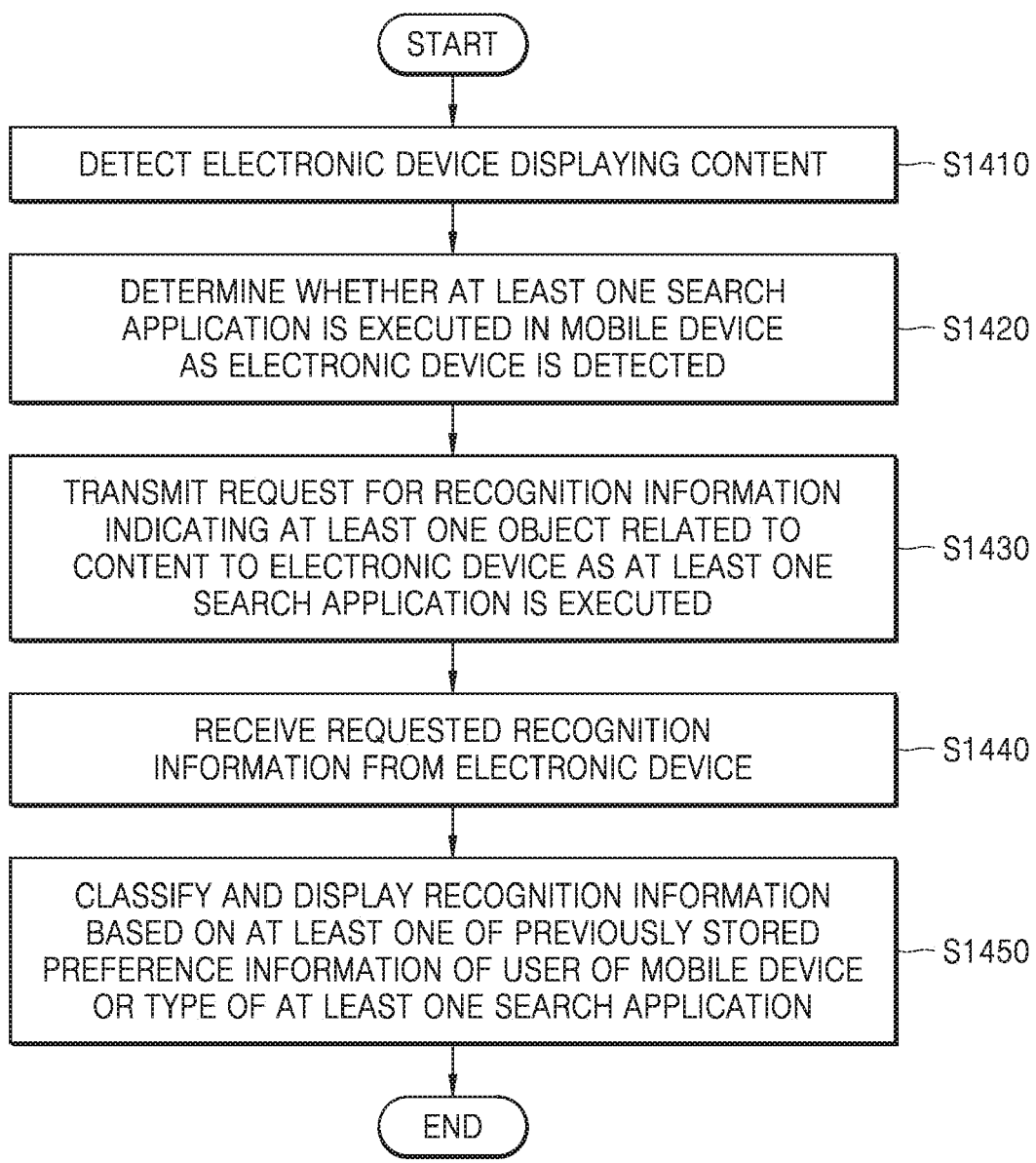
FIG. 14 is a flowchart of a method, performed by a mobile device, of classifying and displaying recognition information about content, based on at least one of a type of a search application or preference information of a user, according to an embodiment.

FIG. 14 is a flowchart of a method, performed by the mobile device 100, of classifying and displaying recognition information about content, based on at least one of a type of a search application or preference information of a user, according to an embodiment.

In operation S1410, the mobile device 100 may detect the electronic device 10 that displays content.

Operation S1410 may correspond to operation S210 described with reference to FIG. 2.

In operation S1420, as the mobile device 100 detects the electronic device 10, the mobile device 100 may determine whether at least one search application is activated in the mobile device 100.

Operation S1420 may correspond to operation S220 described with reference to FIG. 2.

In operation S1430, as at least one search application is executed, the mobile device 100 may transmit a request for recognition information indicating at least one object related to the content to the electronic device 10.

Operation S1430 may correspond to operation S230 described with reference to FIG. 2.

In operation S1440, the mobile device 100 may receive the requested recognition information from the electronic device 10.

Operation S1440 may correspond to operation S240 described with reference to FIG. 2.

In operation S1450, the mobile device 100 may display recognition information arranged based on at least one of previously stored user preference information of the mobile device 100 or a type of a search application.

The mobile device 100 according to an embodiment may previously store the user preference information of the mobile device 100. Herein, the user preference information may be determined based on profile information including a gender, an age, a job, etc., of the user, and a type of information searched through the search application and the number of times the search is performed before the user receives the recognition information of the content.

The mobile device 100 may classify a keyword of each of a plurality of objects included in the received recognition information according to a high preference priority based on the user preference information. For example, when the received recognition information includes keywords of an automobile A, a blouse B, and a cafe C and the number of times the user has recently searched information is 10 times for women's clothing and 5 times for famous restaurants, then the mobile device 100 may display the recognition information in an order of the blouse B, the cafe C, and the automobile A.

According to another embodiment, the mobile device 100 may calculate a relevance between the keyword of each of the plurality of objects included in the received recognition information and the search application. For example, when the search application is a clothing shopping mall application, the mobile device 100 may display, with a first priority, the blouse B having the highest relevance with the clothing shopping mall application among the keywords of the automobile A, the blouse B, and the cafe C included in the recognition information.

The mobile device 100 may arrange and display the received recognition information according to at least one of the user preference information or the type of the search application, thereby accurately providing recognition information the user of the mobile device 100 desires to search for.

Figure 15:
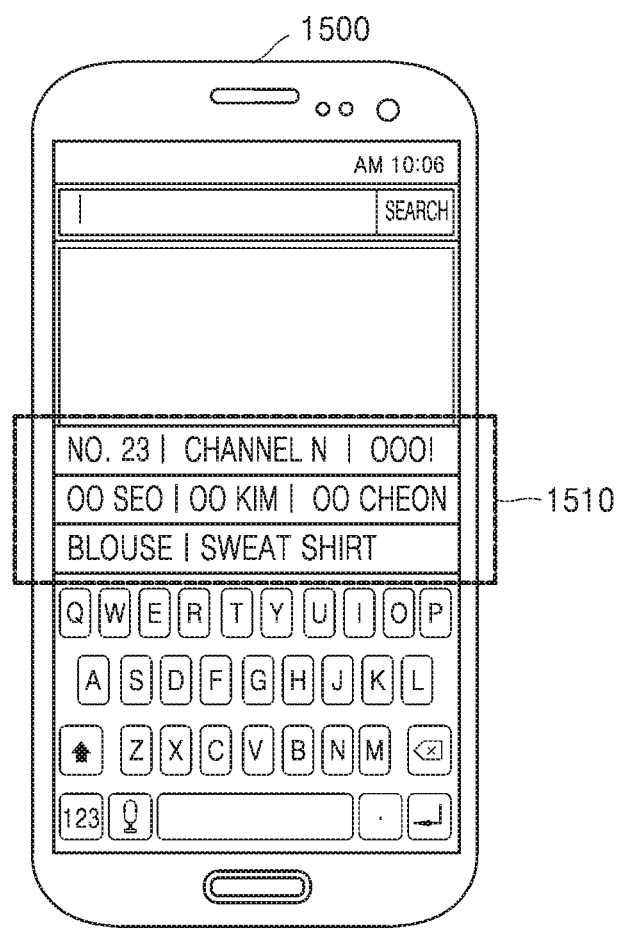
FIG. 15 is a view for describing a method, performed by a mobile device, of classifying and displaying received recognition information, based on a preset category, according to an embodiment.

FIG. 15 is a view for describing a method, performed by a mobile device 1500, of classifying and displaying received recognition information, based on a preset category, according to an embodiment.

Referring to FIG. 15, the mobile device 1500 may classify keywords of the plurality of objects included in the received recognition information, according to preset categories. For example, the preset category may include a character, channel information, clothing, etc., which is merely an example, and the category is not limited to the example.

The recognition information received by the mobile device 1500 according to an embodiment may include keywords "No. 23, channel N, OOO!, OO Seo, OO Kim, OO Cheon, blouse and sweat shirt". The mobile device 1500 may classify and display the received recognition information according to categories including identification information, a character, and clothing of the content. Thus, the mobile device 1500 may classify a channel number "No. 23", a channel name "channel N", and a title of the content "OOO!", which are included in the identification information of the content, as one group. The mobile device 1500 may classify characters "OO Seo", "OO Kim", and "OO Cheon" as one group, and clothing "blouse" and "sweat shirt" as another group.

The mobile device 1500 may display recognition information 1510 classified according to the preset categories on a preset region on a screen of the mobile device 1500.

Figure 16:
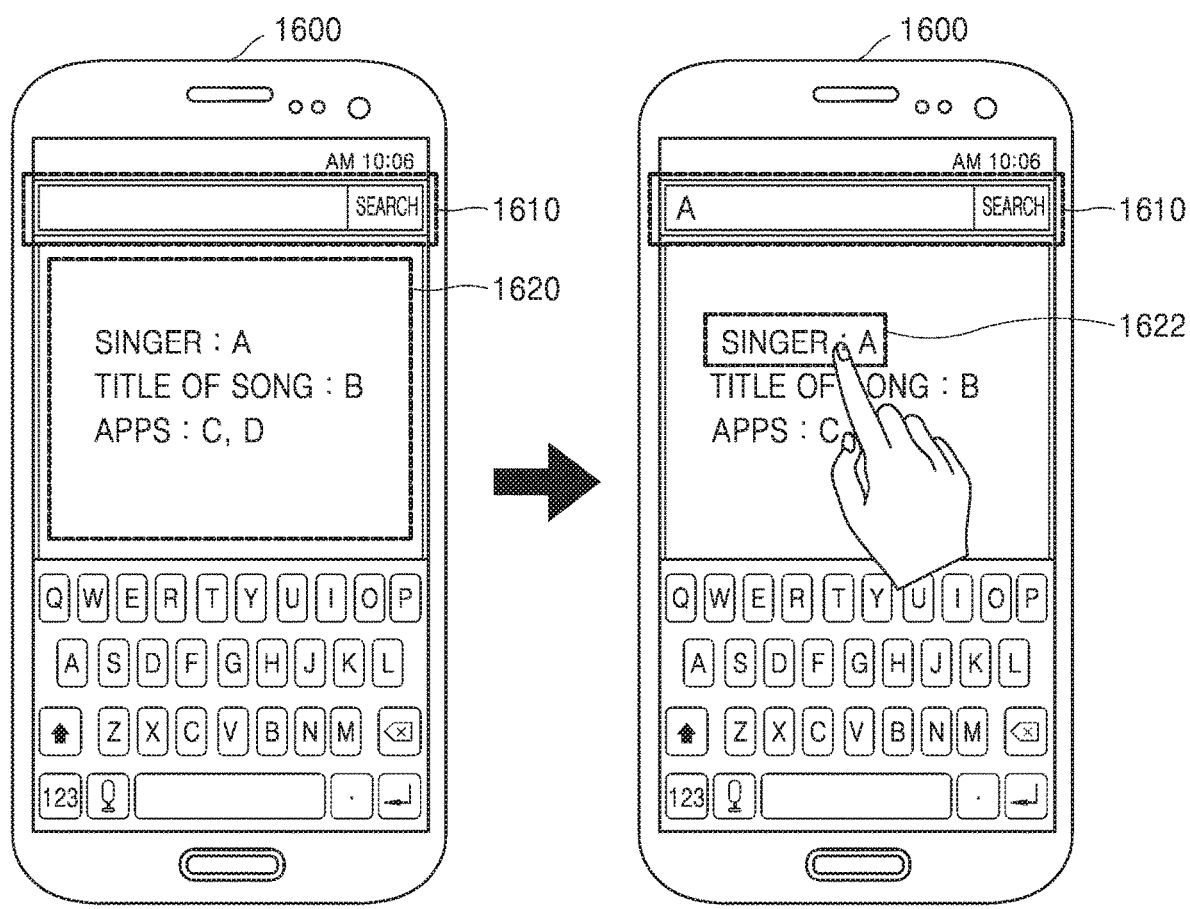
FIG. 16 is a view for describing a method, performed by a mobile device, of displaying recognition information including an object displayed on content and an object related to the object displayed on content, according to another embodiment.

FIG. 16 is a view for describing a method, performed by a mobile device 1600, of displaying recognition information including an object displayed on content and an object related to the object displayed on content, according to another embodiment.

As the mobile device 1600 according to an embodiment detects activation of a search window 1610 of a search application, the mobile device 1600 may transmit a request for recognition information of content displayed on a previously detected electronic device to the electronic device.

Thus, the electronic device may recognize an object displayed on a screen on which the content is played and generate recognition information. Meanwhile, the electronic device may include, in the recognition information, information indicating an object related to the object displayed on the screen other than the object displayed on the screen.

For example, referring to FIG. 16, the electronic device may recognize a name of a singer appearing on a music program and a title of a song of the singer. Herein, a method, performed by the electronic device, of recognizing the name of the singer and the title of the song of the singer may correspond to the foregoing description made with reference to FIG. 3.

The electronic device may include, in the recognition information, identification information of an application capable of playing the song of the singer as the information indicating the related object, together with the singer and the title of the song of the singer.

The mobile device 1600 according to an embodiment may receive, from the electronic device, recognition information 1620 including a singer appearing on a music program, a title of a song of the singer, and identification information of an application capable of playing the song of the singer, and display the received recognition information 1620 on the screen.

The mobile device 1600 may input a name 1622 of the singer to a search window 1610 as the name 1622 of the singer is selected by the user from among keywords indicated in the recognition information 1620.

Figure 17A:
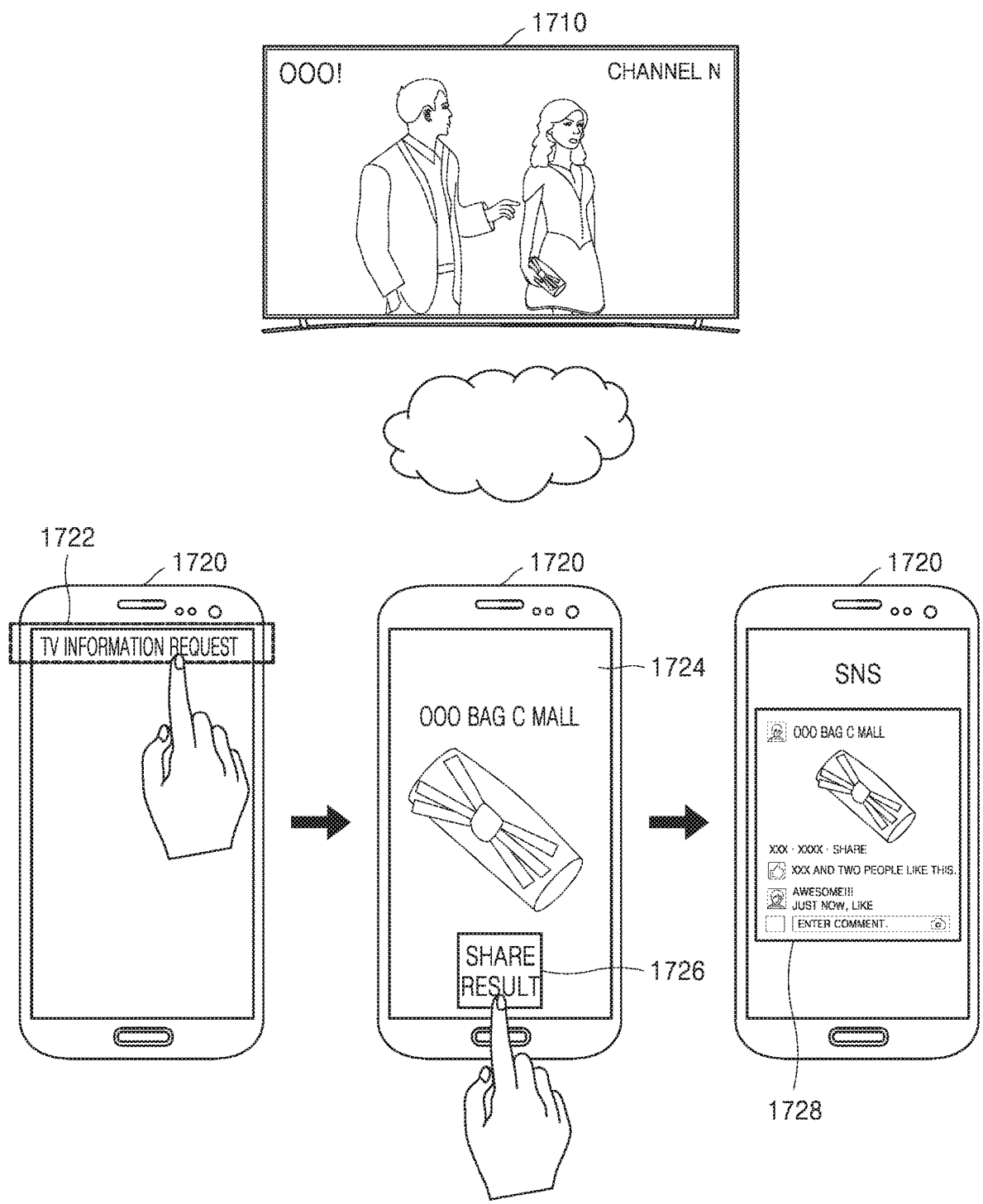
FIG. 17A is a view for describing a method, performed by a mobile device, of sharing recognition information received from an electronic device with another user, according to an embodiment.

FIG. 17A is a view for describing a method, performed by a mobile device 1720, of sharing recognition information received from an electronic device 1710 with another user, according to an embodiment.

Referring to FIG. 17A, the mobile device 1720 may detect the electronic device 1710 that outputs a drama "OOO". The mobile device 1720 may display a TV information request button 1722 as the electronic device 1710 is detected. Herein, the TV information request button 1722 is merely an example, and the mobile device 1720 may display an icon, a button, etc., in another form for determining whether the user desires to obtain recognition information.

As the user touches the TV information request button 1722, the mobile device 1720 may transmit a request for the recognition information to the electronic device 1710. Thus, the electronic device 1710 may generate recognition information indicating an object related to the currently displayed drama "OOO". For example, the electronic device 1710 may generate recognition information including information 1724 about a bag worn by an actor/actress A in the drama "OOO" (e.g., an image of the bag, a name of a brand of the bag, etc.). The electronic device 1710 may transmit the generated recognition information to the mobile device 1720.

The mobile device 1720 according to an embodiment may display the recognition information received from the electronic device 1710 on the screen. The mobile device 1720 may display the entire received recognition information on the screen, but it is assumed in the current embodiment that information 1724 about the bag worn by the actor/actress A, selected by the user from among the received recognition information, is displayed on the screen.

The mobile device 1720 may determine whether to share the received recognition information with another device. For example, the mobile device 1720 may display a result share button 1726 for determining whether to share the received recognition information through a social network service (SNS) or a messenger service. When the user touches the result share button 1726, the mobile device 1720 may share the received recognition information or a part of the received recognition information selected by the user through the SNS or the messenger service. Thus, the mobile device 1720 may display an SNS screen 1728 on which the information 1724 about the bag worn by the actor/actress A is shared. Meanwhile, FIG. 17A is merely an example, and the mobile device 1720 may display, together with the result share button 1726, an additional menu for selecting any one of a plurality of SNSs or messenger services. The user of the mobile device 1720 may select a service for sharing a result through the additional menu.

Meanwhile, as the recognition information is shared through the SNS or messenger service, another user using the SNS or messenger service may obtain the recognition information by selecting the shared recognition information. In another example, another user may watch a content part corresponding to a time when the recognition information is generated, by selecting the shared recognition information. When the other user selects the shared recognition information, the content part corresponding to the time when the recognition information is generated may be provided, through a device having a display function, located around the other user.

Figure 17B:
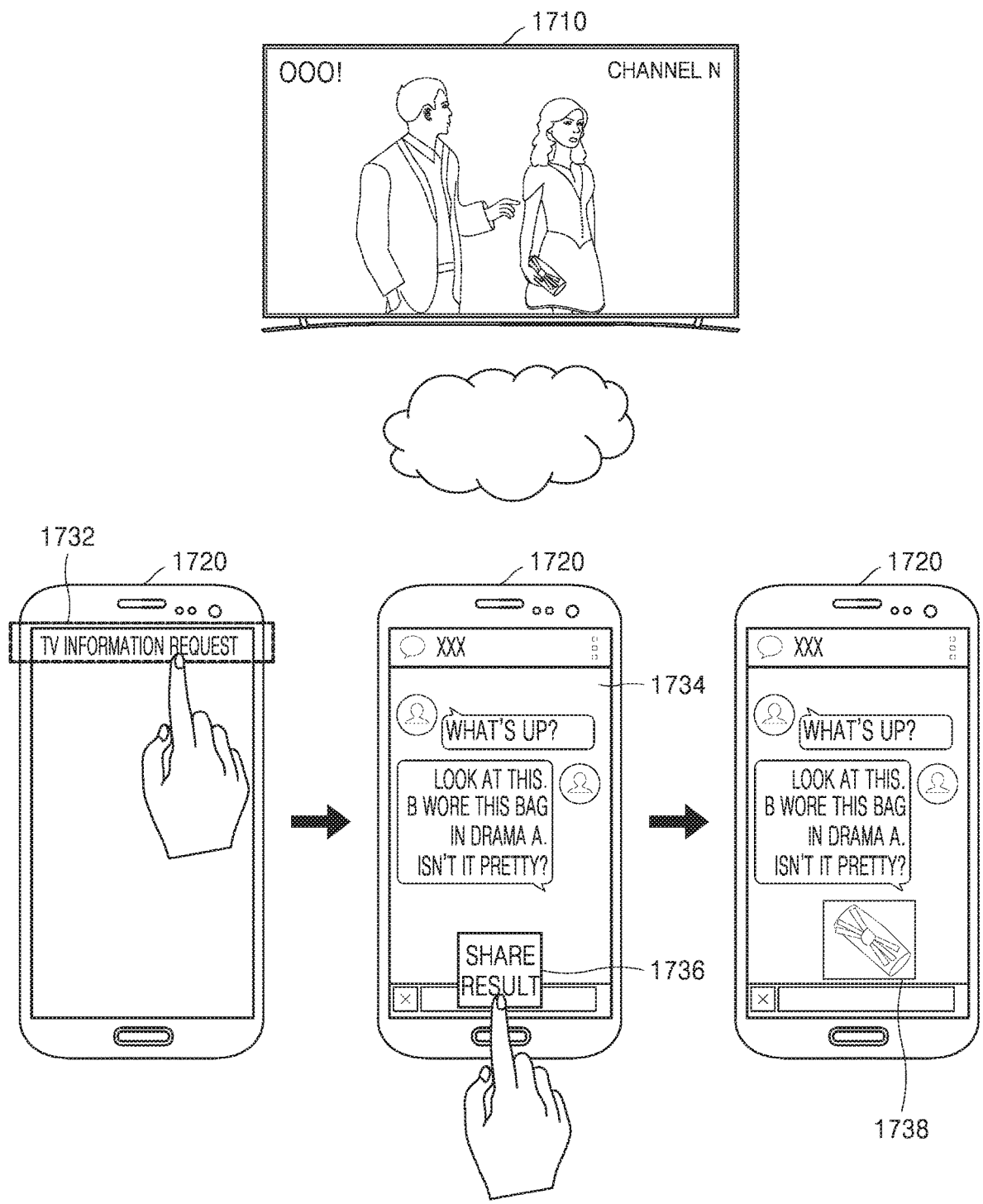
FIG. 17B is a view for describing a method, performed by a mobile device, of sharing recognition information received from an electronic device with another user, according to another embodiment.

FIG. 17B is a view for describing a method, performed by the mobile device 1720, of sharing recognition information received from the electronic device 1710 with another user, according to another embodiment.

In FIG. 17B, as described above with reference to FIG. 17A, it is assumed that as the user touches the TV information request button 1722—the mobile device 1720 receives recognition information from the electronic device 1710.

Meanwhile, in the current embodiment, it is assumed that a messenger application executed on the mobile device 1720. When a text related to the received recognition information is included in a text input to a messenger window of the messenger application, the mobile device 1720 may display the result share button 1726 on a partial region of the messenger window.

When the user touches the result share button 1726—the mobile device 1720 may display information corresponding to the text input to the messenger window, included in the received recognition information. For example, the mobile device 1720 may recognize a text of the messenger window, "a bag worn by an actor/actress B appearing on a drama A", and display information 1728 about the bag worn by the actor/actress B, included in the received recognition information, on the messenger window. The information 1728 about the bag worn by the actor/actress B may include, for example, an image of the bag, uniform resource locator (URL) information of a shopping mall in which the bag may be purchased, etc., which is merely an example, and the information displayed on the messenger window is not limited to the example.

Figure 18:
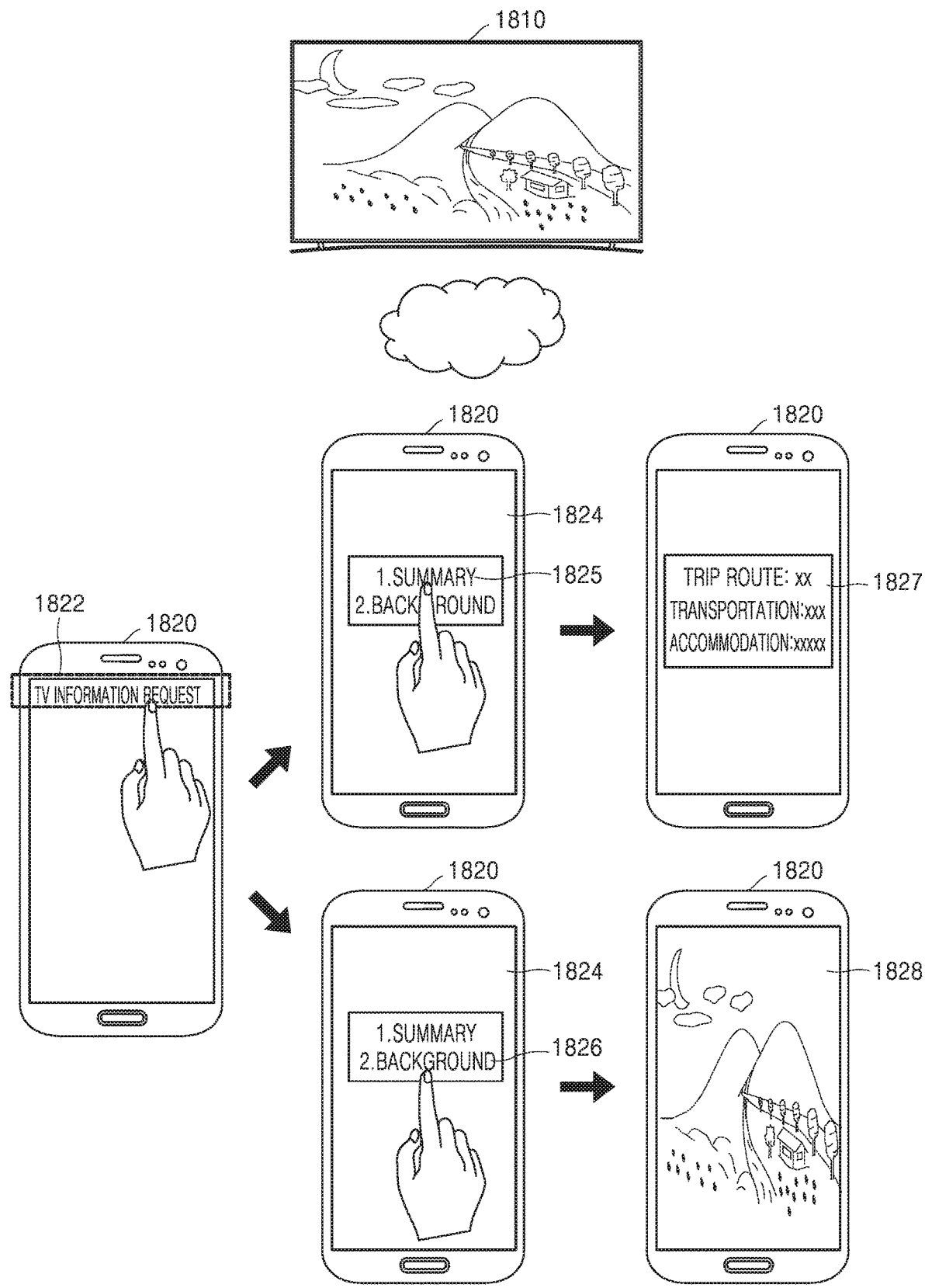
FIG. 18 is a view for describing a type of recognition information received by a mobile device from an electronic device, according to an embodiment.

FIG. 18 is a view for describing a type of recognition information received by a mobile device 1820 from an electronic device 1810, according to an embodiment.

Referring to FIG. 18, the mobile device 1820 may detect the electronic device 1810 that outputs a trip program "C program". The mobile device 1820 may display a TV information request button 1822 as the electronic device 1810 is detected.

As the user touches the TV information request button 1822, the mobile device 1820 may display a menu 1824 for selecting a type of recognition information. In the menu 1824, a summary button 1825 for requesting summary information of the "C program" and a background screen button 1826 for setting an image included in the "C program" to a background screen of the mobile device 1820 may be displayed.

When the user selects a summary button 1825, the mobile device 1820 according to an embodiment may provide information summarized from details of "C program" played from a time when the summary button 1825 is selected. For example, as the summary button 1825 is selected, the mobile device 1820 may transmit, to the electronic device 1810, a request for recognition information including summary information from a time when the summary button 1825 is selected to a time when the "C program" ends. In another example, the mobile device 1820 may summarize details from the time when the summary button 1825 is selected, included in the recognition information received from the electronic device 1810. Thus, the mobile device 1820 may display summary details 1827 of the "C program" on the screen. Herein, the summary details 1827 of the "C program" may include a trip route, a transportation, accommodation, etc., which is merely an example, and the summary details 1827 are not limited to the example.

Meanwhile, when the user selects the background screen button 1826, the mobile device 1820 according to another embodiment may receive, as recognition information, an image displayed on the electronic device 1810 in a time when the background screen button 1826 is selected. In another example, the mobile device 1820 may receive, as recognition information, an image in a time when the background screen button 1826 is selected, included in the recognition information received from the electronic device 1810. The mobile device 1820 may set the received image as a background screen 1828 of the mobile device 1820.

Figure 19:
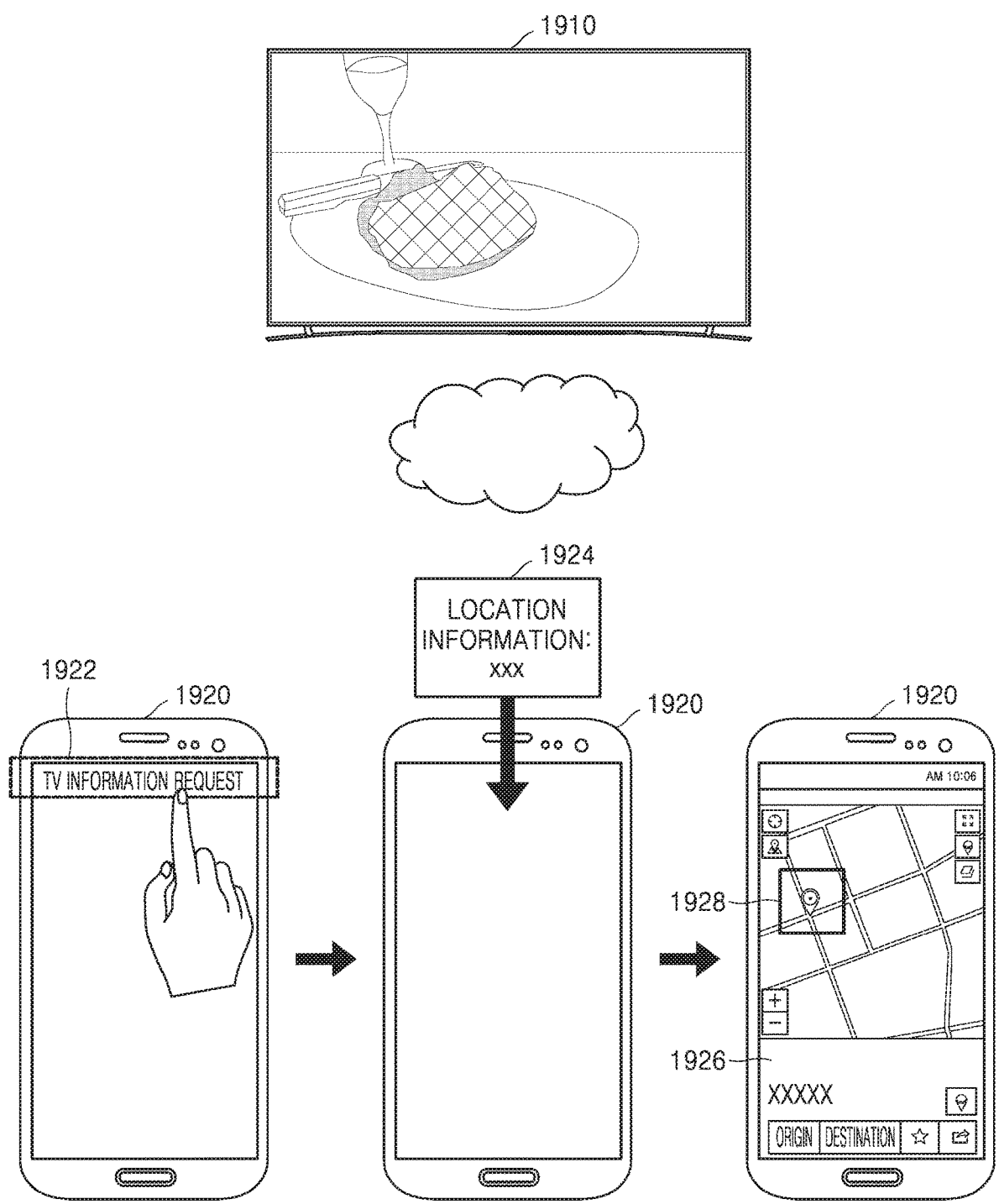
FIG. 19 is a view for describing a method, performed by a mobile device, of providing recognition information received from an electronic device to a user, according to an embodiment.

FIG. 19 is a view for describing a method, performed by a mobile device 1920, of providing recognition information received from an electronic device 1910 to a user, according to an embodiment.

Referring to FIG. 19, the mobile device 1920 may detect the electronic device 1910 that outputs a food program "D program". The mobile device 1920 may display a TV information request button 1922 as the electronic device 1910 is detected. As the user touches the TV information request button 1922, the mobile device 1920 may receive recognition information about the "D program" from the electronic device 1910. Herein, it is assumed that the recognition information about the "D program" includes a name of a place or location information 1924 of the place, obtained from the "D program". However, this is merely an example, and the information included in the recognition information is not limited to the example.

The mobile device 1920 may store the received name or location information 1924 of the place. The mobile device 1920 may store the received name or location information 1924 of the place in a location information providing application installed in the mobile device 1920. Thus, when the user is located around the place corresponding to the received name or location information 1924 of the place, the mobile device 1920 may display a place name 1926 and a place location 1928 on an execution screen by executing the location information providing application. Thus, the user may identify the current location of the user as being around the place appearing on content the user has watched on the electronic device 1910.

Figure 20:
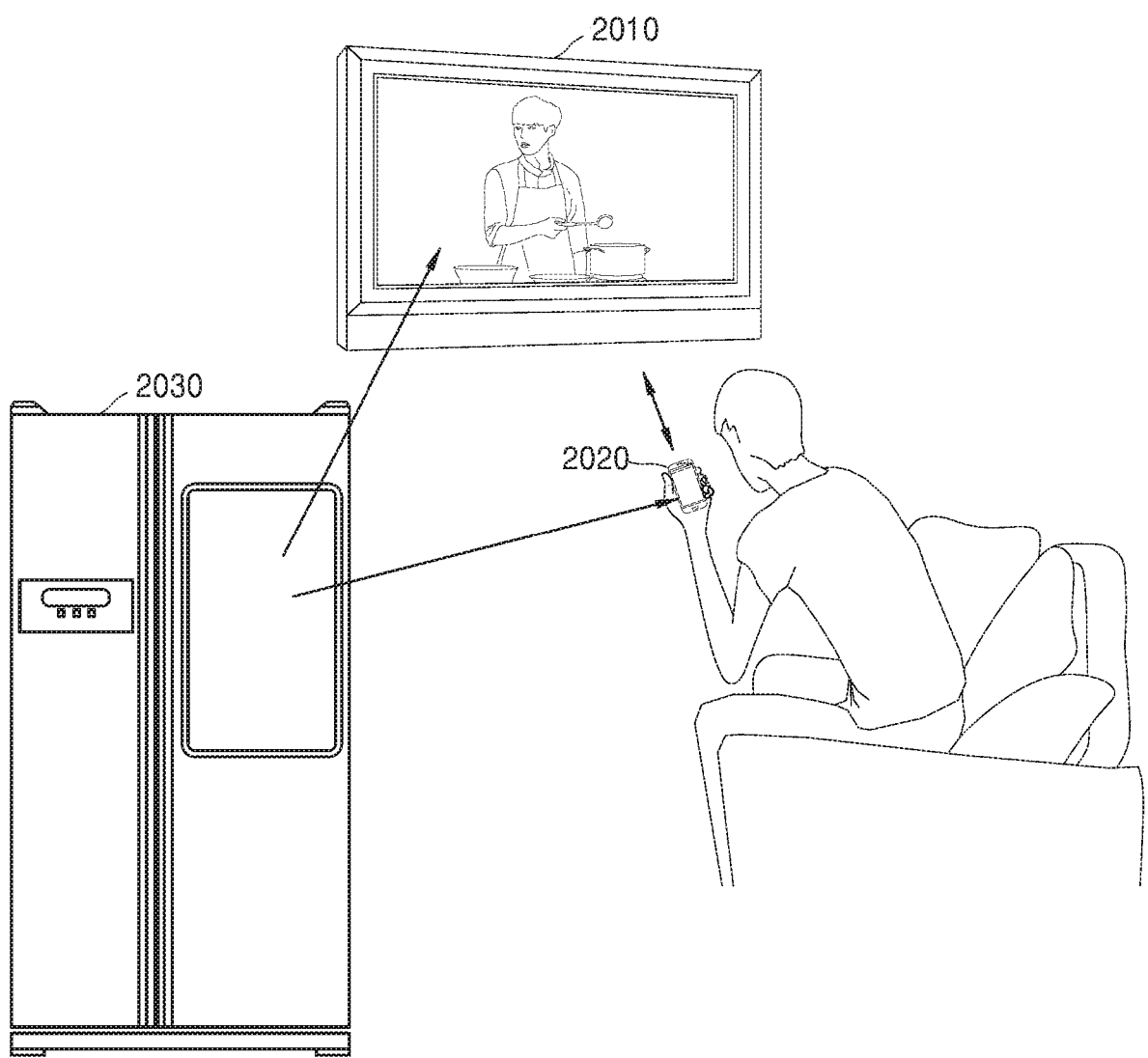
FIG. 20 is a view for describing a method of providing information about content in an electronic device, a mobile device, and a refrigerator through interworking among the electronic device, the mobile device, and the refrigerator, according to an embodiment.

FIG. 20 is a view for describing a method of providing information about content in an electronic device 2010, a mobile device 2020, and a refrigerator 2030 through interworking among the electronic device 2010, the mobile device 2020, and the refrigerator 2030, according to an embodiment.

Referring to FIG. 20, the mobile device 2020 may detect the electronic device 2010 that outputs a cook program "E program". The mobile device 2020 may display a TV information request button as the electronic device 2010 is detected. As the user touches the TV information request button, the mobile device 2020 may receive recognition information about the "D program" from the electronic device 2010. Herein, it is assumed that the recognition information about the "E program" includes a cooking recipe, obtained from the "E program". However, this is merely an example, and the information included in the recognition information is not limited to the example.

The mobile device 2020 according to an embodiment may transmit the received cooking recipe to the refrigerator 2030. As the refrigerator 2030 receives the cooking recipe from the mobile device 2020, the refrigerator 2030 may compare food items stored in the refrigerator 2030 with the cooking recipe. Herein, it is assumed that the refrigerator 2030 obtains an image of a stored food item through an included camera and identifies a type of the stored food item based on the obtained image. The refrigerator 2030 may transmit information about a food item that is not stored in the refrigerator 2030 among food items related to the cooking recipe to the mobile device 2020.

As the mobile device 2020 receives the information about the food item that is not stored, the mobile device 2020 may display, on the screen of the mobile device 2020, a pop-up message asking an intention of purchase of the food item that is not stored. When the user touches the displayed pop-up message, the mobile device 2020 may recommend a shopping mall in which the non-stored food item may be purchased.

Meanwhile, according to another embodiment, the mobile device 2020 or the electronic device 2010 may receive a recipe for cooking possibly with currently stored ingredients from the refrigerator 2030 and display the recipe.

Figure 21:
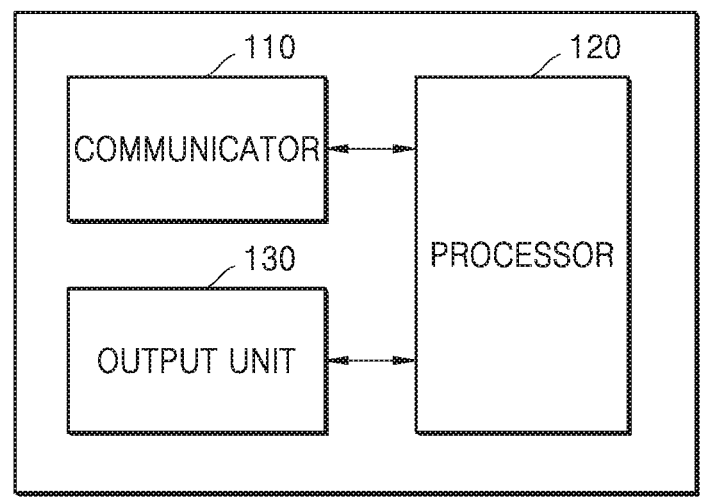
FIGS. 21 and 22 are block diagrams of a mobile device that provides information about content according to an embodiment.
Figure 22:
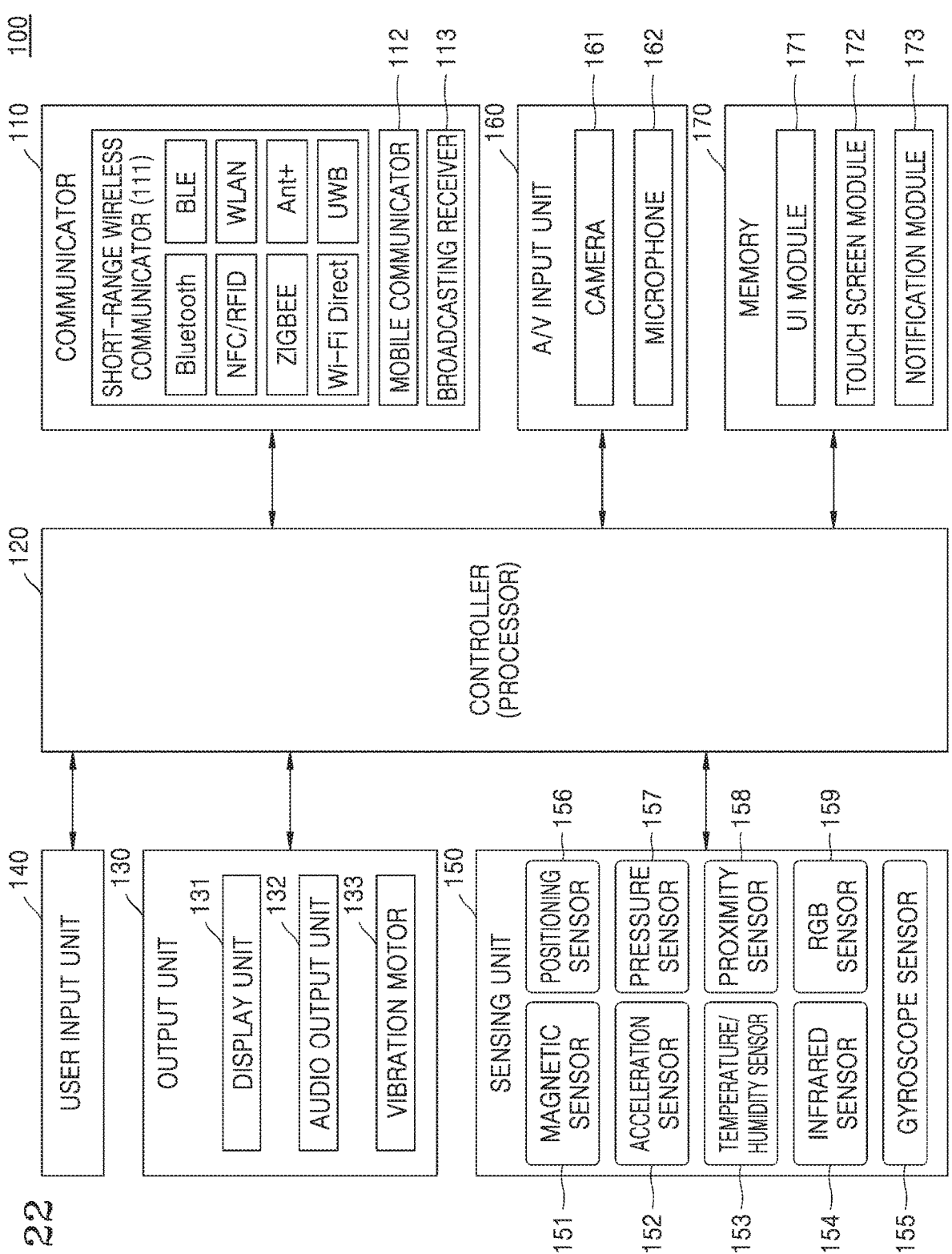

FIGS. 21 and 22 are block diagrams of the mobile device 100 that provides information about content according to an embodiment.

As shown in FIG. 21, the mobile device 100 according to an embodiment of the present disclosure may include a communicator 110, a processor 120, and an output unit 130. However, all the illustrated elements are not essential elements. The mobile device 100 may include a larger or smaller number of elements than the illustrated elements.

For example, as shown in FIG. 22, the mobile device 100 according to an embodiment of the present disclosure may include a user input unit 140, a sensing unit 150, an audio/video (A/V) input unit 160, and a memory 170 in addition to the communicator 110, a processor (or controller) 120, and the output unit 130.

Hereinbelow, the foraging elements will be described in detail.

The communicator 110 may detect the electronic device through a beacon signal transmitted from the electronic device that displays content. As at least one search application is executed by the processor 120, the communicator 110 may transmit a request for recognition information indicating at least one object related to the content to the electronic device. The communicator 110 may receive the requested recognition information requested from the electronic device.

The communicator 110 may transmit the recognition information received from the electronic device to another device connected with the mobile device 100.

Meanwhile, the communicator 110 may include one or more elements that enable communication between the mobile device 100 and the electronic device (not shown) or between the mobile device 100 and a server. For example, the communicator 110 may include a short-range wireless communicator 111, a mobile communicator 112, and a broadcasting receiver 113.

The short-range wireless communicator 111 may include, but not limited to, a Bluetooth Low Energy (BLE) communicator, a near field communication (NFC) unit, a wireless local area network (WLAN) (WiFi) communicator, a ZigBee communicator, an infrared Data Association (IrDA) communicator, a WiFi Direct (WFD) communicator, an ultra wideband (UWB) communicator, and an Ant+ communicator.

The mobile communicator 112 transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The broadcasting receiver 113 receives a broadcast signal and/or broadcasting-related information from an external source through a broadcasting channel. The broadcasting channel may include a satellite channel and a terrestrial channel. According to implementation examples, the mobile device 100 may not include the broadcasting receiver 113.

The processor 120 may control an overall operation of the mobile device 100. For example, the processor 120 may control all of the communicator 110, the output unit 130, the user input unit 140, the sensing unit 150, the A/V input unit 160, and the memory 170 by executing programs stored in the memory 170.

As the electronic device is detected through the communicator 110, the processor 120 may determine whether a search mode is activated in the mobile device 100. For example, the processor 120 may determine whether the search mode is activated, based on at least one of a state of a search window to which a search word is input or a state of an input menu for inputting the search word in at least one search application.

The processor 120 may classify the received recognition information according to a category of at least one object related to content. In another example, the processor 120 may arrange the recognition information based on at least one of previously stored user preference information of the mobile device 100 or a type of at least one search application.

The output unit 130 may be intended to output an audio signal, a video signal, or a vibration signal, and may include a display unit 131, an audio output unit 132, a vibration motor 133, and so forth.

The display unit 131 may display information processed by the mobile device 100. For example, the display unit 131 may display an execution screen of the at least one search application.

The display unit 131 may display the received recognition information on a preset region on the screen of the mobile device 100 on which the at least one search application is displayed.

The display unit 131 may display the recognition information classified according to the category of the at least one object related to the content. In another example, the display unit 131 may display recognition information arranged based on at least one of previously stored user preference information of the mobile device 100 or a type of at least one search application.

When the display unit 131 and a touch pad are constructed as a touch screen in a layer structure, the display unit 131 may be used as an input device as well as an output device. The display unit 131 may include at least one of a liquid crystal display (LCD), a thin film transistor (TFT) LCD, an organic light-emitting diode (OLED), a flexible display, a three-dimensional (3D) display, and an electrophoretic display. According to implementation types of a mobile device 100, the mobile device 100 may include two or more display units 1731. In this case, the two or more display units 1731 may be disposed to face each other by using a hinge.

The audio output unit 132 may output audio data received from the communicator 110 or stored in the memory 170. The audio output unit 132 may output an audio signal related to a function (e.g., a notification sound notifying connection with the electronic device, a pop-up message display sound, etc.) performed in the mobile device 100. The audio output unit 132 may include a speaker, a buzzer, or the like.

The vibration motor 133 outputs a vibration signal. For example, the vibration motor 133 may output a vibration signal corresponding to output of audio data or video data (e.g., a notification corresponding to reception of recognition information, a message receiving sound, etc.). The vibration motor 133 may output a vibration signal if a touch is input to a touch screen.

The user input unit 140 may indicate a means through which the user controls the mobile device 100. For example, the user input unit 140 may include, but not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The user input unit 140 may receive a user input for activating a search mode of a search application executed on the mobile device 100. The user input unit 140 may receive a user input to select any one of the keywords of a plurality of objects included in the recognition information displayed on the mobile device 100.

The sensing unit 150 may sense a state of the mobile device 100 or a state around the mobile device 100 and deliver sensed information to the controller 120. For example, the sensing unit 150 may detect information about a location where the mobile device 100 is located and deliver the information to the processor 120.

The sensing unit 150 may include, but not limited to, at least one of a magnetic sensor 151, an acceleration sensor 152, a temperature/humidity sensor 153, an infrared sensor 154, a gyroscope sensor 155, a positioning sensor (e.g., a global positioning system (GPS)) 156, a pressure sensor 157, a proximity sensor 158, and a red/green/blue (RGB) sensor (or an illuminance sensor) 159. A function of each sensor may be intuitively construed from a name of each sensor by those of ordinary skill in the art, and thus will not be described in detail.

The A/V input unit 160 inputs an audio signal or a video signal and may include a camera 161, a microphone 162, and so forth. The camera 161 obtains an image frame such as a still image or a moving image in a video communication mode or a photographing mode through an image sensor. The image captured by the image sensor is processed by the processor 120 or a separate image processor (not shown).

An image frame processed by the camera 161 is stored in the memory 170 or transmitted to an external source through the communicator 150. Two or more cameras 161 may be provided according to a structure aspect of the electronic device 1000.

The microphone 162 receives an external audio signal and processes the received signal into electric voice data. For example, the microphone 162 may receive an audio signal from an external device or the user. The microphone 162 may use various noise cancellation algorithms for canceling noise generated during reception of the external audio signal.

The memory 170 may store a program for processing and control of the controller 120 and store input/output data (e.g., recognition information, a search word of a search application, preference information, etc.).

The memory 170 may include a storage medium of at least one type of a flash memory type, a hard disk type, a multimedia card micro type, a card type memory (e.g., a secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, an optical disk, and so forth. The mobile device 100 may operate a web storage or a cloud server that performs a storage function of the memory 170 on the Internet.

The programs stored in the memory 170 may be classified into a plurality of modules depending on a function thereof, e.g., a user interface (UI) module 171, a touch screen module 172, a notification module 173, and so forth.

The UI module 171 provides a specialized UI or graphical UI (GUI) interworking with the mobile device 100 for each application. The touch screen module 172 may sense a touch gesture of a user on a touch screen and delivers information about the touch gesture to the processor 120. The touch screen module 172 according to an embodiment of the present disclosure recognizes and analyzes a touch code. The touch screen module 172 may be configured with separate hardware including a controller.

The user's touch gesture may include a tap, a touch & hold, a double tap, a drag, panning, a flick, a drag & drop, a swipe, and so forth.

The notification module 173 generates a signal for notifying that an event of the mobile device 100 has occurred. Examples of the event occurring in the mobile device 100 may include beacon signal reception, message reception, recognition reception, connection with the electronic device, and so forth. The notification module 173 outputs a notification signal as a video signal through the display unit 131, an audio signal through the audio output unit 132, and/or a vibration signal through the vibration motor 133.

Figure 23:
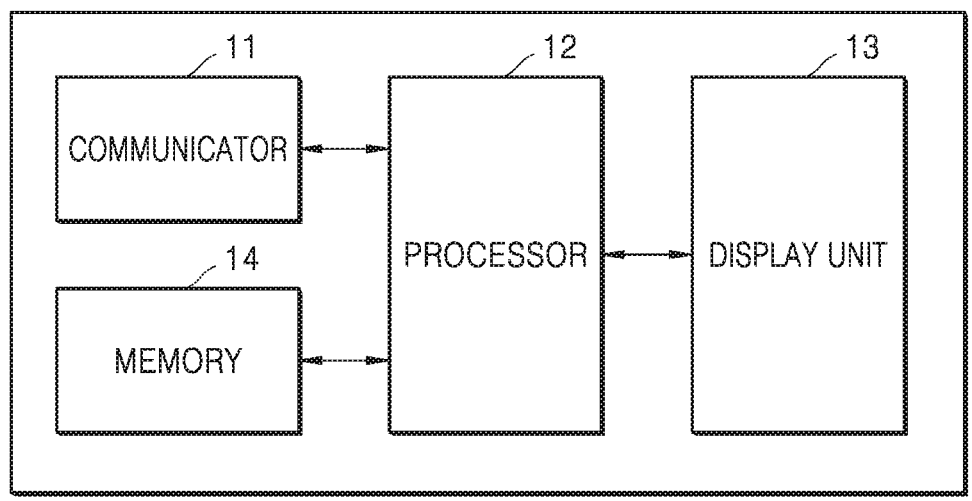
FIG. 23 is a block diagram of an electronic device that provides information about content, according to an embodiment.

FIG. 23 is a block diagram of the electronic device 10 that provides information about content, according to an embodiment.

Referring to FIG. 23, the electronic device 10 according to an embodiment may include a communicator 11, a processor 12, a display unit 13, and a memory 14. However, all the illustrated elements are not essential elements. The electronic device 10 may include a larger or smaller number of elements than the illustrated elements. For example, the electronic device 10 may further include an input/output unit. The electronic device 10 may receive content through the input/output unit.

Hereinbelow, the foraging elements will be described in detail.

The communicator 11 may connect the electronic device 10 with an external device (e.g., a mobile device, an input device, a service providing device, a server, etc.) under control of the processor 12. For example, the processor 12 may transmit/receive content to/from a service providing device connected through the communicator 11, download an application from the service providing device, or browse the web. The communicator 11 may include at least one of a wireless local area network (WLAN), Bluetooth, or wired Ethernet, depending on capabilities and structure of the electronic device 10. The communicator 11 may include a combination of the WLAN, the Bluetooth, and the wired Ethernet. The communicator 11 may receive a control signal of an input device under control of the processor 12. The control signal may be implemented as a Bluetooth type, an RF signal type, or a WiFi type.

The communicator 11 may further include other short-range communications (e.g., near field communication (NFC) (not shown), Bluetooth Low Energy (BLE) (not shown), etc.) in addition to Bluetooth.

The communicator 11 may transmit a beacon signal at preset time intervals. As at least one search application is executed in a mobile device having detected the electronic device 10 through the beacon signal, the communicator 11 may receive a request for recognition information indicating an object related to the content from the mobile device. For example, as the search mode is executed on the mobile device, the communicator 11 may receive the request for the recognition information from the mobile device.

The communicator 11 may transmit recognition information generated in the processor 12 to the mobile device.

The processor 12 may control an overall operation of the electronic device 10. For example, the processor 12 may control the communicator 11 and the display unit 13 overall, by executing programs stored in the memory 14. The processor 12 may perform the method of recognizing content described above with reference to FIGS. 1 to 20, by executing programs stored in the memory 14.

As the request for the recognition information of the content is received, the processor 12 may generate the recognition information indicating the object related to the content. For example, the processor 12 may recognize the object related to the content, based on at least one of a captured image of the screen on which the content is output or metadata of the content.

The processor 12 may classify at least one object related to the content according to a preset category to generate the recognition information.

The display unit 13 may convert an image, a data signal, an on-screen display (OSD) signal, a control signal, or the like, processed by the processor 12, to generate a driving signal. The display unit 13 may be implemented with a plasma display panel (PDP), a liquid crystal display (LCD), an organic light-emitting diode (OLED), a flexible display, or the like, and may also be implemented with a three-dimensional (3D) display. The display unit 13 may include a touch screen and thus may be used as an input device as well as an output device.

The display unit 13 according to an embodiment may display the received content. Herein, the display unit 13 may correspond to the screen in that the content is displayed on the display unit 13.

The memory 14 may store various data, programs, or applications for driving and controlling the electronic device 10 under control of the processor 12. The memory 14 may store a control program for control of the electronic device 10 and the processor 12, an application that is initially provided from a manufacturer or downloaded from an external source, a graphic user interface (GUI) associated with the application, an object (e.g., an image, a text, an icon, a button, etc.) for providing the GUI, user information, a document, databases, or related data.

In an embodiment, the term "memory" may include a storing unit 1940, ROM 1922 or RAM 1921 of the processor 12, or a memory card (e.g., a micro secure digital (SD) card, a USB memory, etc., not shown) mounted on the electronic device 10. The memory 14 may include a non-volatile memory, a volatile memory, a hard disk drive (HDD), or a solid state drive (SSD).

The storing unit 14 may include a broadcasting reception module, a channel control module, a volume control module, a communication control module, a voice recognition module, a motion recognition module, a light reception module, a display control module, an audio control module, an external input control module, a power control module, a power control module of an external device connected wirelessly (for example, by Bluetooth), a voice database (DB), or a motion DB. Modules and DBs (not shown) of the storing unit ( ) 14 may be implemented as software to perform a control function of broadcasting reception, a channel control function, a volume control function, a communication control function, a voice recognition function, a motion recognition function, a light reception control function, a power control function, or a power control function of an external device connected wirelessly (e.g., by Bluetooth) in the electronic device 10. The processor 12 may perform respective functions by using the foregoing software stored in the memory 14.

The methods according to the embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program instructions include machine language code created by a complier and high-level language code executable by a computer using an interpreter.

An apparatus according to the present disclosure may include a processor, a memory for storing program data and executing it, a permanent storage such as a disk drive, a communications port for communicating with external devices, and user interface devices, such as a touch panel, a key, a button, etc. Methods implemented with a software module or algorithm may be stored as computer-readable code or program instructions executable on the processor on computer-readable recording media. Examples of the computer-readable recording media may include a magnetic storage medium (e.g., read-only memory (ROM), random-access memory (RAM), floppy disk, hard disk, etc.) and an optical medium (e.g., a compact disc-ROM (CD-ROM), a digital versatile disc (DVD), etc.) The computer-readable recording medium may also be distributed over network-coupled computer systems so that computer-readable code is stored and executed in a distributed fashion. The medium may be read by a computer, stored in a memory, and executed by a processor.

Reference numerals have been used in embodiments illustrated in the attached drawings, and particular terms have been used to describe the embodiments, but the embodiments are not limited to the particular terms, and the present disclosure may include any element that may be generally conceived by those of ordinary skill in the art.

The embodiment may be represented by block components and various process operations. Such functional blocks may be implemented by various numbers of hardware and/or software components which perform specific functions. For example, the present disclosure may employ various integrated circuit components, e.g., memory elements, processing elements, logic elements, look-up tables, and the like, which may carry out a variety of functions under the control of one or more microprocessors or other control devices. The embodiment may employ the same type or different types of cores or different types of CPUs. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented as an algorithm executed in one or more processors. Furthermore, the embodiment may employ any number of conventional techniques for electronics configuration, signal processing and/or control, data processing and the like. The term "mechanism", "element", "means", or "component" is used broadly and is not limited to mechanical or physical embodiments. The term may include a series of routines of software in conjunction with the processor or the like.

The particular implementations shown and described in an embodiment are illustrative examples and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. Moreover, no item or component is essential to the practice of the present disclosure unless the element is specifically described as "essential" or "critical".

Herein (especially, in the claims), the use of "the" and other demonstratives similar thereto may correspond to both a singular form and a plural form. Also, when a range is described in an embodiment, the range has to be regarded as including inventions adopting any individual element within the range (unless described otherwise), and it has to be regarded as having written in the detailed description each individual element included in the range. Unless the order of operations of a method according to an embodiment is explicitly mentioned or described otherwise, the operations may be performed in a proper order. The embodiments are not limited to the order the operations are mentioned. The use of all examples or exemplary terms (e.g., "etc.,", "and (or) the like", and "and so forth") in an embodiment is merely intended to describe the embodiment in detail, and the scope of the embodiment is not necessarily limited by the examples or exemplary terms unless defined by the claims. Also, one of ordinary skill in the art may appreciate that the present disclosure may be configured through various modifications, combinations, and changes according to design conditions and factors without departing from the spirit and technical scope of the present disclosure and its equivalents.

The invention claimed is:

1. A method, performed by a mobile device, of providing information about content, the method comprising:
 detecting an electronic device displaying the content;
 determining at least one search application executed on the mobile device, as the electronic device is detected;

determining a search mode activated, based on at least one of a search window to which a search word is input being displayed on a screen, a keyboard menu for inputting the search word being displayed on the screen, or a voice command being in a reception wait state for inputting the search word, as the at least one search application is executed;

transmitting a request for recognition information indicating at least one object related to the content to the electronic device, as the search mode is activated;

receiving the requested recognition information from the electronic device; and displaying the received recognition information on a preset area on the screen of the mobile device, wherein the displaying of the received recognition information comprises at least one of displaying the received recognition information on a preset region between the search window and the keyboard menu or displaying the received recognition information above the keyboard menu in a form of a label.

2. The method of claim 1, wherein the determining the search mode activated further comprises determining that a cursor is displayed on the search window.

3. The method of claim 1, further comprising:
classifying the received recognition information according to a category of at least one object related to the content; and
displaying the classified recognition information on the screen of the mobile device.

4. The method of claim 1, further comprising:
arranging the recognition information based on at least one of previously stored preference information of a user of the mobile device or a type of the at least one search application; and
displaying the arranged recognition information on the screen of the mobile device.

5. The method of claim 1, wherein the displaying of the received recognition information comprises displaying the received recognition information above a search menu as a bar.

6. The method of claim 1, wherein the displaying of the received recognition information comprises providing information about a result of inputting keywords included in the received recognition information through separate tabs.

7. A mobile device for providing information about content, the mobile device comprising:
a transceiver configured to detect an electronic device through a signal transmitted from the electronic device displaying the content;
a processor configured to determine whether at least one search application is executed on the mobile device, as the electronic device is detected and whether a search mode is activated, based on at least one of a search window to which a search word is input being displayed on a screen, a keyboard menu for inputting the search word being displayed on the screen, or a voice command being in a reception wait state for inputting the search word, as the at least one search application is executed; and
a display on which an execution screen of the at least one search application is displayed,
wherein the transceiver is further configured to transmit a request for recognition information indicating at least one object related to the content to the electronic device, as the search mode is activated, and receive the requested recognition information from the electronic device, and
wherein the display is configured to display the received recognition information on one of a preset region between the search window and the keyboard menu or a preset region above the keyboard menu in a form of a label.

8. The mobile device of claim 7, wherein the determining of whether the search mode is activated further comprises determining whether a cursor is displayed on the search window.

9. The mobile device of claim 7,
wherein the processor is further configured to classify the received recognition information according to a category of at least one object related to the content, and
wherein the display is configured to display the classified recognition information on the screen of the mobile device.

10. The mobile device of claim 7,
wherein the processor is further configured to arrange the recognition information based on at least one of previously stored preference information of a user of the mobile device or a type of the at least one search application, and
wherein the display is further configured to display the arranged recognition information.

11. The mobile device of claim 7, wherein the display is further configured to display the received recognition information above a search menu as a bar.

12. The mobile device of claim 7, wherein the display is further configured to provide information about a result of inputting keywords included in the received recognition information through separate tabs.

13. A non-transitory computer-readable recording medium having recorded thereon a program for executing the method of claim 1.

* * * * *